(12) United States Patent
Kelsey et al.

(10) Patent No.: US 8,779,964 B2
(45) Date of Patent: *Jul. 15, 2014

(54) MULTI-SPECTRAL, SELECTIVELY REFLECTIVE CONSTRUCT

(71) Applicant: W. L. Gore & Associates, Inc., Newark, DE (US)

(72) Inventors: William D. Kelsey, Elkton, MD (US); Gregory D. Culler, Nottingham, PA (US); Emmanuel Gustav Van-Dyck, Newark, DE (US); John D. Holcombe, West Grove, PA (US); Edward C. Gunzel, Oxford, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,962

(22) Filed: Mar. 8, 2013

(65) Prior Publication Data

US 2013/0180657 A1 Jul. 18, 2013

Related U.S. Application Data

(60) Division of application No. 12/391,595, filed on Feb. 24, 2009, which is a continuation-in-part of application No. 12/195,794, filed on Aug. 21, 2008.

(60) Provisional application No. 60/986,741, filed on Nov. 9, 2007.

(51) Int. Cl.
*H01Q 17/00* (2006.01)
*F41H 3/00* (2006.01)

(52) U.S. Cl.
USPC .............................................. 342/3; 428/919

(58) Field of Classification Search
USPC ................................ 428/919; 442/131; 342/3
See application file for complete search history.

(56) References Cited

U.S. PATENT DOCUMENTS

| | | |
|---|---|---|
| 3,953,566 A | 4/1976 | Gore |
| 4,095,940 A | 6/1978 | Weingarten |
| 4,142,015 A | 2/1979 | Bienz |
| 4,308,882 A | 1/1982 | Pusch et al. |
| 4,467,005 A | 8/1984 | Pusch et al. |
| 4,479,994 A | 10/1984 | Berg |
| 4,539,256 A | 9/1985 | Shipman |
| 4,560,595 A | 12/1985 | Johansson |
| 4,606,848 A | 8/1986 | Bond |

(Continued)

FOREIGN PATENT DOCUMENTS

| | | |
|---|---|---|
| DE | 20 16 404 | 1/1997 |
| GB | 2 237 862 | 10/1990 |
| GB | 2 281 748 | 3/1995 |

OTHER PUBLICATIONS

Yshield EMR-Protection, Y-Shield Shielding Paints, Material Safety Data Sheet, www.yshield.com, Pocking, Germany.

*Primary Examiner* — Matthew M Barker
(74) *Attorney, Agent, or Firm* — Carol A. Lewis White

(57) ABSTRACT

A selectively reflective construct, and a method for making the construct, are described. In one embodiment reflectance, transmission and absorption properties may be controlled in multiple electromagnetic bands. A construct is described comprising a) a thermally transparent, visually opaque substrate comprising a polymeric material and a colorant, and b) a thermally reflective layer comprising a low emissivity component which is optionally transparent to radar signal.

10 Claims, 12 Drawing Sheets

(56) References Cited

U.S. PATENT DOCUMENTS

| | | |
|---|---|---|
| 4,615,921 A | 10/1986 | Johansson |
| 4,621,012 A | 11/1986 | Pusch |
| 4,645,704 A * | 2/1987 | Hellwig .................. 428/176 |
| 4,726,989 A | 2/1988 | Mrozinski |
| 4,862,730 A | 9/1989 | Crosby |
| 4,863,792 A | 9/1989 | Mrozinski |
| 4,953,922 A | 9/1990 | Granqvist |
| 5,077,101 A | 12/1991 | Conway et al. |
| 5,185,381 A | 2/1993 | Ruffoni |
| 5,281,460 A | 1/1994 | Cox |
| 5,312,678 A | 5/1994 | McCullough, Jr. et al. |
| 5,523,757 A | 6/1996 | Resnick |
| 5,571,621 A | 11/1996 | Stevens |
| 5,750,242 A | 5/1998 | Culler |
| 5,922,986 A | 7/1999 | Wanninger |
| 5,955,175 A | 9/1999 | Culler |
| 5,976,643 A | 11/1999 | Sallee |
| 6,224,982 B1 | 5/2001 | Woldanski |
| 6,288,837 B1 | 9/2001 | Hubbard |
| 6,374,413 B1 | 4/2002 | Magee |
| 6,780,515 B2 | 8/2004 | Dobler |
| 6,800,573 B2 | 10/2004 | Van De Ven et al. |
| 6,997,981 B1 | 2/2006 | Coombs et al. |
| 7,118,801 B2 | 10/2006 | Ristic-Lehmann et al. |
| 7,344,661 B2 * | 3/2008 | Kuehl .................. 252/582 |
| 8,524,621 B2 * | 9/2013 | Liggett et al. .................. 442/131 |
| 2005/0144697 A1 | 7/2005 | Casey |
| 2006/0222827 A1 | 10/2006 | Marshall et al. |
| 2007/0009679 A1 | 1/2007 | Holcombe et al. |
| 2007/0072501 A1 | 3/2007 | Holcombe et al. |
| 2007/0161310 A1 * | 7/2007 | Shope .................. 442/181 |
| 2009/0214852 A1 | 8/2009 | Kelsey et al. |
| 2009/0263644 A1 | 10/2009 | Kelsey et al. |

* cited by examiner

MULTI-SPECTRAL, SELECTIVELY REFLECTIVE CONSTRUCT

CROSS REFERENCE TO RELATED CASES

This patent application is a divisional application of pending application U.S. Ser. No. 12/391,595 filed Feb. 24, 2009; which claims the benefit of pending application U.S. Ser. No. 12/195,794, filed Aug. 21, 2008; which further claims benefit of provisional application U.S. Ser. No. 60/986,741, filed Nov. 9, 2007.

FIELD OF THE INVENTION

This invention relates to a selectively reflective construct, controlling reflectance and transmission in the visible, nIR, SWIR, MWIR, LWIR, and radar bands of the EM spectrum.

BACKGROUND OF THE INVENTION

Camouflage materials used by hunters and by the military typically provide camouflage properties in the visible portion of the electromagnetic (EM) spectrum. Recent improvements to military camouflage have extended performance into the nIR portion and the short wave infrared (SWIR). Due to the increased use of thermal imaging sensors operating in the mid wave infrared (MWIR) and long wave infrared (LWIR) EM bands, military users have sought enhanced protection in these sensor bands.

Conventional means for achieving camouflage performance in the thermal bands often creates higher reflectance in the visible and nIR bands of the EM spectrum. Likewise, performance in the visible and nIR bands often increases detection in the thermal bands. Thus, an effective multi-spectral (visible, nIR, SWIR, MWIR, LWIR) solution has not been available to control reflectance, transmission and absorption properties in a single construct throughout these distinct bands of the EM spectrum.

SUMMARY OF THE INVENTION

A construct is described wherein reflectance, transmission and absorption properties may be controlled in multiple EM bands including visible, nIR, MWIR and LWIR. For the purposes of this invention, visible is defined as 400-600 nm, nIR is defined to be 700-1000 nm, MWIR is defined to be 3-5 µm, and LWIR is defined to be 9-12 µm. Methods described herein may also be suitable for forming constructs having suitable properties in the 8-14 µm wavelength range.

In one embodiment, a construct is described comprising a) a first component that is a thermally transparent, visually opaque substrate comprising a polymeric layer and colorant, and b) second component that is a thermally reflective layer comprising a low emissivity component adjacent a surface of the thermally transparent, visually opaque substrate. The construct has an average reflection of i) less than about 70% in the wavelength range of 400-600 nm, ii) less than about 70% in the wavelength range of 700-1000 nm, iii) greater than about 25% in the wavelength range of 3-5 µm, and iv) greater than about 25% in the wavelength range of 9-12 µm.

Constructs are described that are both thermally reflective and radar reflective. Other embodiments are described that are thermally reflective and radar transparent. Some constructs transmit radar waves through the construct thickness, while providing attenuation in multiple portions of the electromagnetic spectrum such as vis, nIR, SWIR, MWIR and/or LWIR. Some constructs can have 0% transmission at 1 to about 100 GHz, while other constructs provide 100% transmission at 1 to about 100 GHz. A construct will be considered radar transparent herein, if it is capable of transmitting radar waves in a manner which provides an average radar transmission of greater than 90% throughout the frequency range of 1 to about 5 GHz. A construct may also be made having a radar transmission greater than 90% throughout the frequency range of 1 to about 20 GHz, and/or also, a transmission of greater than 90% throughout the frequency range of 1 to about 100 GHZ.

In one embodiment a construct is provided that has an average reflection of i) less than about 70% in the wavelength range of 400-600 nm, ii) less than about 70% in the wavelength range of 700-1000 nm, iii) greater than about 25% in the wavelength range of 3-5 µm, and iv) greater than about 25% in the wavelength range of 9-12 µm; and v) an average radar transmission greater than 90% throughout the frequency range of 1-5 GHz. A radar transparent construct may be provided in a location positioned between a radar sensor or detector and a radar camouflaged article. Alternatively, a radar camouflaging layer that absorbs, reflects or scatters radar signal may be used in combination with a radar transparent construct.

A method for multi-spectrally camouflaging a surface or object is described which comprises the steps of a) providing a thermally transparent, visually opaque substrate comprising a polymeric material and a colorant; b) providing a thermally reflective layer comprising a low emissivity surface; c) disposing the low emissivity surface adjacent the thermally transparent, visually opaque substrate to form a multi-spectral, selectively reflective construct; and d) positioning the multi-spectral, selectively reflective construct between a detection means and an object being viewed.

BRIEF DESCRIPTIONS OF FIGURES

DETAILED DESCRIPTION OF THE INVENTION

Multi-spectral, selectively reflective constructs are described with reference to FIGS. 1-8. For the purposes of this invention, visible is defined as 400 nm-600 nm, nIR is defined to be 700 nm-1000 nm, MWIR is defined to be 3 μm-5 μm, and LWIR is defined to be 9 μm-12 μm. MWIR and LWIR spectral response represents the thermal region.

Figure 1:
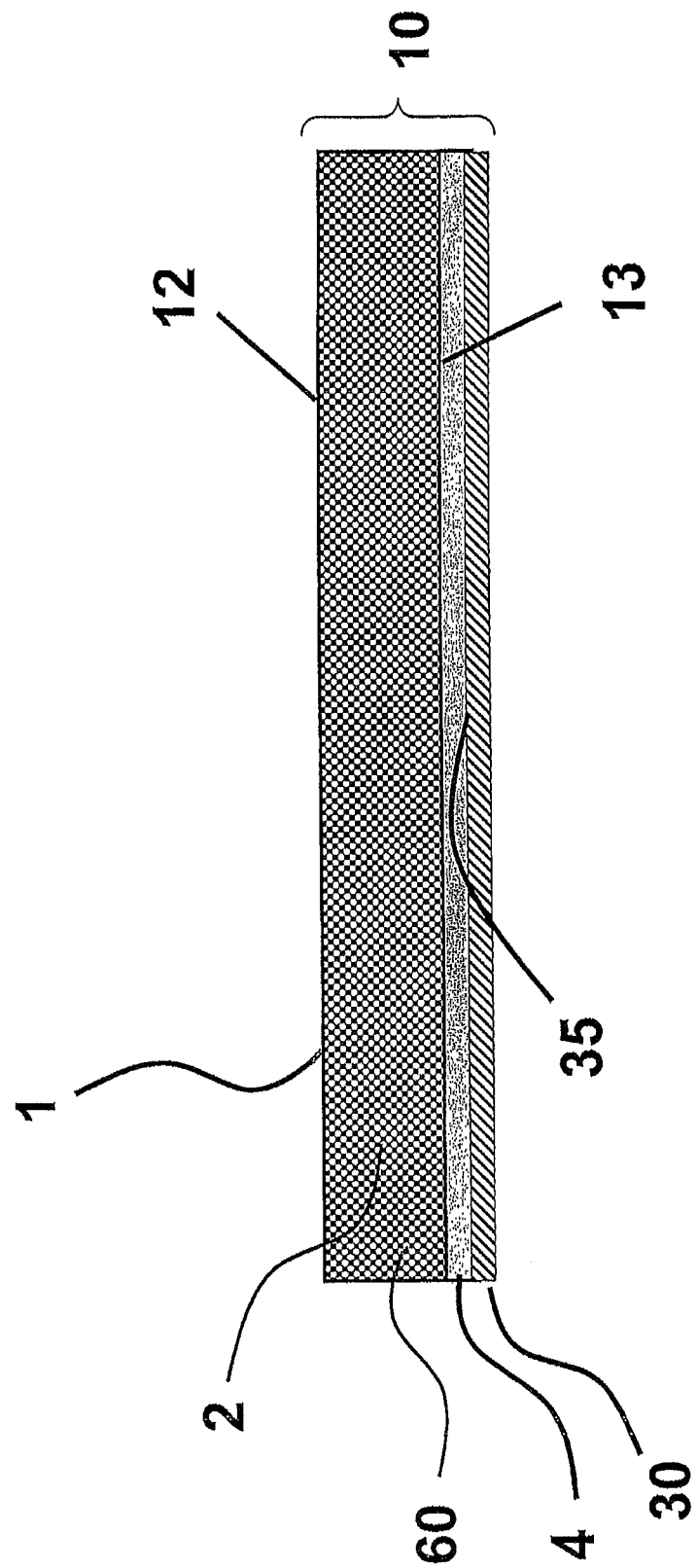
FIG. 1 is a cross-sectional view of a schematic of a selectively reflective construct

As exemplified by the cross-sectional view of the schematic construct illustrated in FIG. 1, in one embodiment a construct (10) comprises a first component comprising a thermally transparent, visually opaque substrate (1) having a first surface (12) and a second surface (13); and a second component comprising a thermally reflective layer (30). The thermally reflective layer (30) comprises a low emissivity component, and is adjacent the second surface (13) of the thermally transparent, visually opaque substrate (1). The multi-spectral, selectively reflective construct has an average reflection of: i) less than about 70% in the wavelength range of 400 nm to 600 nm; ii) less than about 70% in the wavelength range of 700 nm to 1000 nm; iii) greater than about 25% in the wavelength range of 3 μm to 5 μm; and iv) greater than about 25% in the wavelength range of 9 to 12 μm.

In a further embodiment, a multi-spectral, selectively reflective construct is made having an average reflection of: i) less than about 50% in the wavelength range of 400 nm to 600 nm; ii) less than about 70% in the wavelength range of 700 nm to 1000 nm; iii) greater than about 25% in the wavelength range of 3 μm to 5 μm; and iv) greater than about 25% in the wavelength range of 9 μm to 12 μm. Another construct may be prepared having an average reflection of: i) less than about 70% in the wavelength range of 400 nm to 600 nm; ii) less than about 50% in the wavelength range of 700 nm to 1000 nm; iii) greater than about 25% in the wavelength range of 3 μm to 5 μm; and iv) greater than about 25% in the wavelength range of 9 μm to 12 μm. Further embodiment may be prepared wherein the multi-spectral, selectively reflective construct has an average reflection of: i) less than about 70% in the wavelength range of 400 nm to 600 nm; ii) less than about 70% in the wavelength range of 700 nm to 1000 nm; iii) greater than about 25% in the wavelength range of 3 μm to 5 μm; and iv) greater than about 35% in the wavelength range of 9 μm to 12 μm.

Further with regard to FIG. 1, the construct (10) comprises a first component that is a thermally transparent, visually opaque substrate (1) that is optically colored. The thermally transparent, visually opaque substrate (1) is comprised of a polymeric material (2) and a colorant (60). To form a thermally transparent substrate, the polymeric material (2) is comprised of a polymer having high transmission in the 3 μm-5 μm and 9 μm-12 μm bandwidths. The thermally transparent, visually opaque substrate (1) will be considered thermally transparent if it has a average transmission greater than about 30% at 3 μm to 5 μm (MWIR) and 9 μm to 12 μm (LWIR). In some embodiments, constructs are formed having a thermally transparent, visually opaque substrate having an average transmission of greater than or equal to about 40%, 50%, 60% or 70% in the wavelength range of 3 to 5 μm and/or an average transmission of greater than or equal to about 40%, 50%, 60% or 70% in the wavelength range of 9 μm to 12 μm.

The polymeric material (2) of the thermally transparent, visually opaque substrate (1) may include polytetrafluoroethylene (PTFE), microporous expanded PTFE (ePTFE), fluorinated ethylene propylene (FEP), perfluoroalkoxy copolymer resin (PFA), and polyolefins, including polypropylene and polyethylene. The polymeric material may be porous or microporous, or monolithic. The term microporous, as used herein, can describe the structure of microporous polymer layers having a node and fibril microstructure similar microporous polymeric materials described in and formed by the methods described in U.S. Pat. No. 3,953,566, the description and methods of which are hereby incorporated by reference. Other suitable microporous polymeric layers may a microstructure similar to that depicted in U.S. Pat. Nos. 4,539,256; 4,726,989; or 4,863,792, which are also incorporated by reference. A microporous structure of a polymer introduces many polymer/air interfaces (e.g. pores) that reduce the optical transparency of the polymer in the visible wavelength region. This can increase the whiteness of an otherwise clear or translucent polymer layer.

The polymeric materials may be a continuous or discontinuous polymeric film. The polymeric material comprises a polymeric layer which may comprise polymeric films or fibers. Material thickness, index of refraction, and porosity of the polymeric material (2) may be selected to achieve desired levels of visual opacity and thermal transparency. Polymeric layers having thickness of greater than 5 microns (μm) may be suitable for certain applications. In other embodiments, polymeric layers greater than about 20 μm, greater than about 40 μm, or greater than about 100 μm may be suitable.

The first component comprising the thermally transparent, visually opaque substrate will be considered visually opaque when the optical density is greater than about 0.30 between 475 nm and 675 nm, when measured according to the method described herein. In other embodiments constructs may have thermally transparent, visually opaque substrates having optical densities greater than about 0.70, greater than about 0.75, or greater than about 1.0, between 475 nm and 675 nm. Embodiments wherein the thermally transparent, visually opaque substrate has optical density greater than about 1.5, greater than about 2, or greater than about 3, between 475 nm and 675 nm, may also be considered useful. Specific optical densities, thermal and nIR properties may be achieved by the combination of polymeric material (2) and colorant (60).

Microporous polymeric films may be particularly suitable where the porosity of the film is selected to contribute to the desired level of visual opacity. In one embodiment exemplified by FIG. 6, a first component is a thermally transparent, visually opaque substrate (1) comprising a microporous polymeric material (2). Microporous polymeric films having a thickness ranging from about 5 μm-300 μm may be suitable for certain constructs used herein. For example, a construct may comprise a thermally transparent, visually opaque substrate that comprises a microporous polytetrafluoroethylene (ePTFE) film having a thickness less than about 50 microns and having an optical density greater than about 0.50. In one particular embodiment, a thermally transparent, visually opaque substrate comprises a microporous polytetrafluoroethylene (ePTFE) film approximately 35 microns thick with an optical density of 0.77. Alternately, a construct may comprise a thermally transparent, visually opaque substrate comprising a microporous ePTFE film having a thickness less than about 120 microns with an optical density greater than about 0.90. In a particular embodiment, a thermally transparent, visually opaque substrate comprises a microporous ePTFE film that is approximately 110 microns thick with an optical density of about 1.1.

Colorant may be used to affect the visible, nIR, and SWIR spectral response. The colorant (60) may be comprised of one or more additives that absorb, refract, and/or reflect light. The colorant (60) may be disposed on either the first surface (12) or second surface (13) of the polymeric material (2), within the polymeric material, or disposed on both the first and second surfaces and within the polymeric material. The colorant may comprise one or more dyes including, but not limited to acid dyes, disperse dyes, mordant dyes, and solvent dyes. The colorant may comprise one or more pigments including, but not limited to carbon pigments, cadmium pigments, iron oxide pigments, zinc pigments, arsenic pigments, and organic pigments. The colorant may be applied as an ink, toner, or other appropriate print media to deliver the dye or pigment onto or into the polymeric substrate. Ink suitable for use in the present invention may be solid, aqueous, or solvent based.

Figure 3:
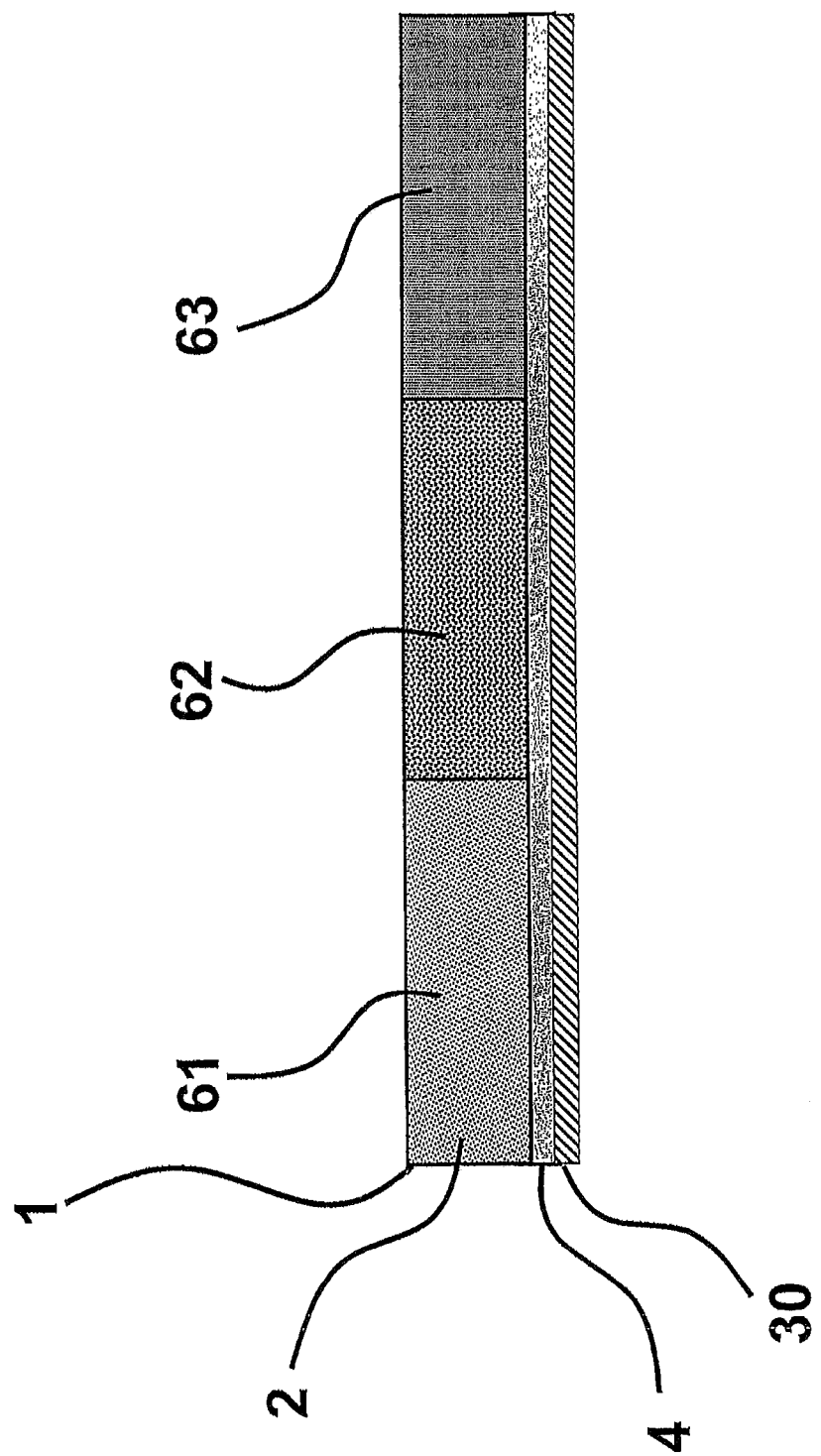
FIG. 3 is a cross-sectional view of a schematic of a selectively reflective construct.
Figure 4:
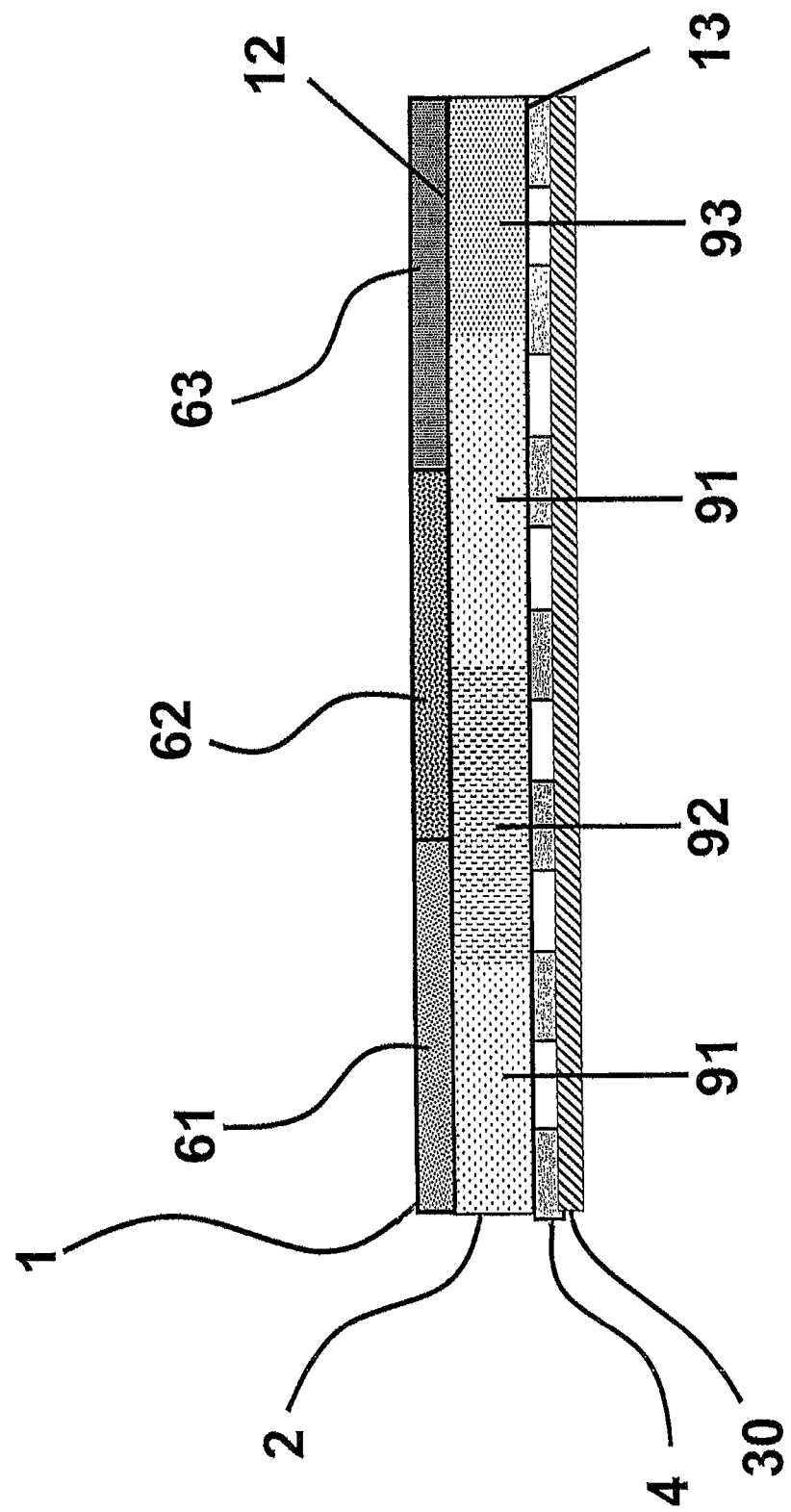
FIG. 4 is a cross-sectional view of a schematic of a selectively reflective construct.
Figure 6:
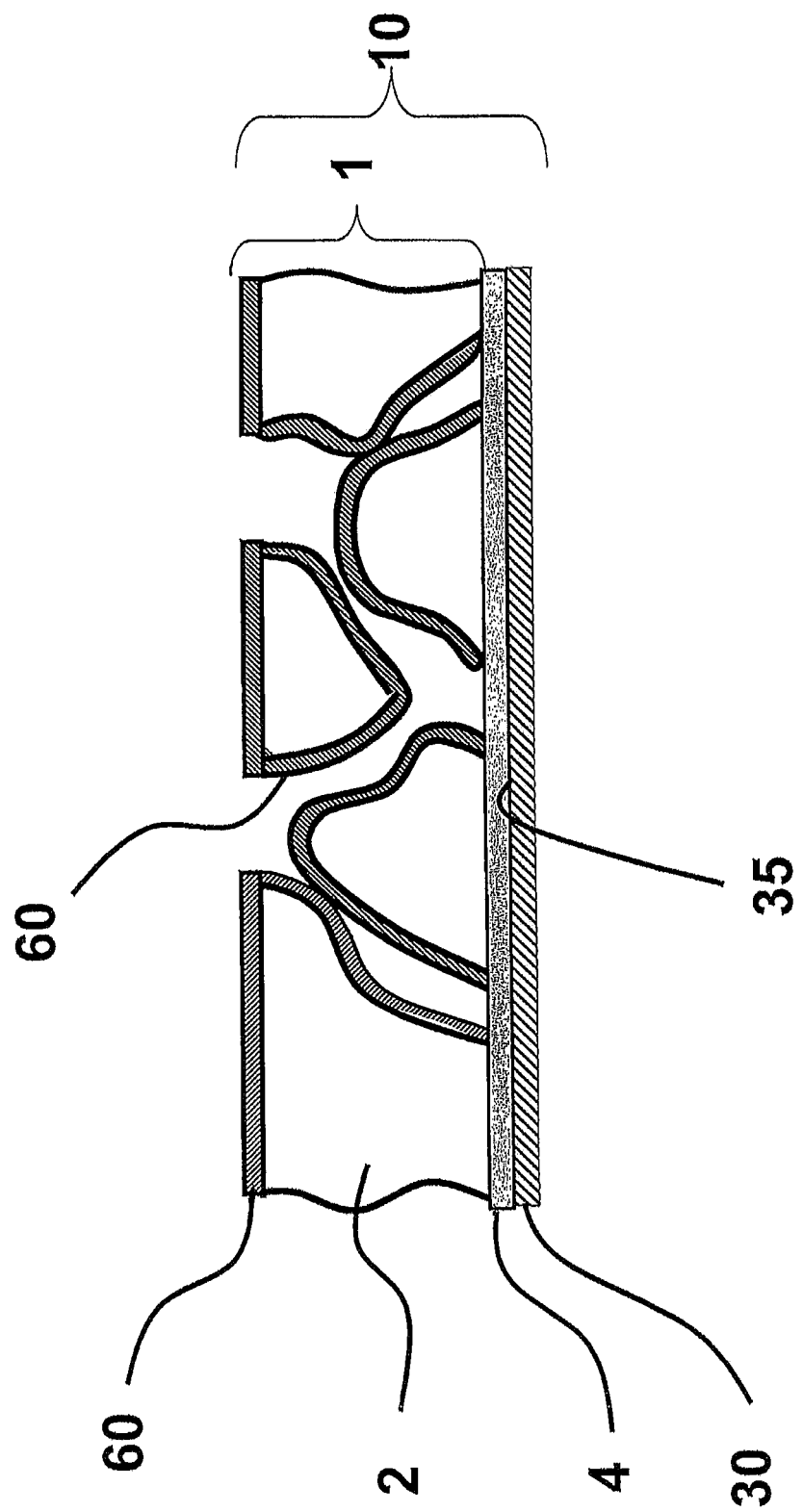
FIG. 6 is a cross-sectional view of a schematic of a selectively reflective construct.

The colorant (60) may comprise a single colorant or the colorant may be comprised of one or more colorants (60, 61, 62, and 63), for example, as a blend of more than one colorant. In a further embodiment, the first component comprising the thermally transparent, visually opaque substrate (1) may comprise multiple colorants (61, 62, 63) and the multiple colorants may be applied in discrete patterns as depicted in FIG. 3, or a pattern such as a camouflage pattern. Where disposed on a surface of the first component, such as the first surface (12) of the polymeric material (2) as depicted in FIG. 4, the multiple colorants (61, 62, 63) may be bonded to the polymeric material, for example, by the selection of dyes with the appropriate bond sites, or by use of binders which affix the colorant to the polymeric material. As used herein, the first surface (12) of the polymeric material (2) refers to the surface oriented outwardly, away from a wearer or object to be shielded from detection, or the surface of the polymeric material facing in the direction of an EM sensor or detector. As depicted in FIG. 6, the colorant (60) may be imbibed into the polymeric material (2), and may coat the pore walls of a porous polymeric material. Alternately, colorant (60) may be added as a filler to the polymeric material (2).

To obtain the desired visual opacity of the first component comprising the thermally transparent, visually opaque substrate (1), properties of the polymeric material (2), such as material thickness, index of refraction, and porosity, are balanced. In certain embodiments where thinner materials are preferred, for example for added flexibility, thinner materials may be too visually transparent to achieve the desired properties of the final construct. Therefore, in some embodiments visual opacity may be increased by increasing porosity. Visual opacity within a desired range may also be achieved by the selection and concentration of colorant (60) in combination with the selection of the polymeric material (2). For example, where a polymeric material is selected having an optical density less than about 0.30, a colorant may be added to increase the optical density, so that the thermally transparent, visually opaque substrate comprising the polymeric material and colorant has an optical density greater than about 0.30. Both colorant type and concentration may be selected to achieve the desired visual opacity of the first component comprising the thermally transparent, visually opaque substrate (1). In one embodiment a first component comprises a microporous polytetrafluoroethylene (ePTFE) layer approximately 35 microns thick with an optical density of 0.77. In another embodiment a first component comprises a microporous ePTFE layer approximately 110 microns thick with an optical density of about 1.1.

In one embodiment, a construct which comprises a first component that is a thermally transparent, visually opaque substrate comprising a microporous ePTFE layer approximately 35 microns thick and a carbon colorant, has an optical density greater than 1.5. In another embodiment, a construct is formed wherein the thermally transparent, visually opaque substrate comprises a microporous ePTFE and colorant, having an optical density greater than 4.0; in an alternate embodiment comprising a similar colorant, a thermally transparent, visually opaque substrate comprising a visually transparent monolithic polyethylene polymeric layer has an optical density of greater than 1.0.

In addition to providing performance in the visible region of the EM spectrum, constructs may be formed having specific levels of reflection and absorption in the near-infrared (nIR) region of the EM spectrum. Preferred constructs have a reflectance of less than 70% in the wavelength range of 700 µm-1000 µm. A thermally transparent, visually opaque substrate comprising a polymeric material may be formed having a desired level of nIR reflection. To achieve a desired level of nIR reflection in the final construct, the level of nIR reflection of the first component may be adjusted to account for effects that result from the addition of the other layers of the construct.

Figure 2:
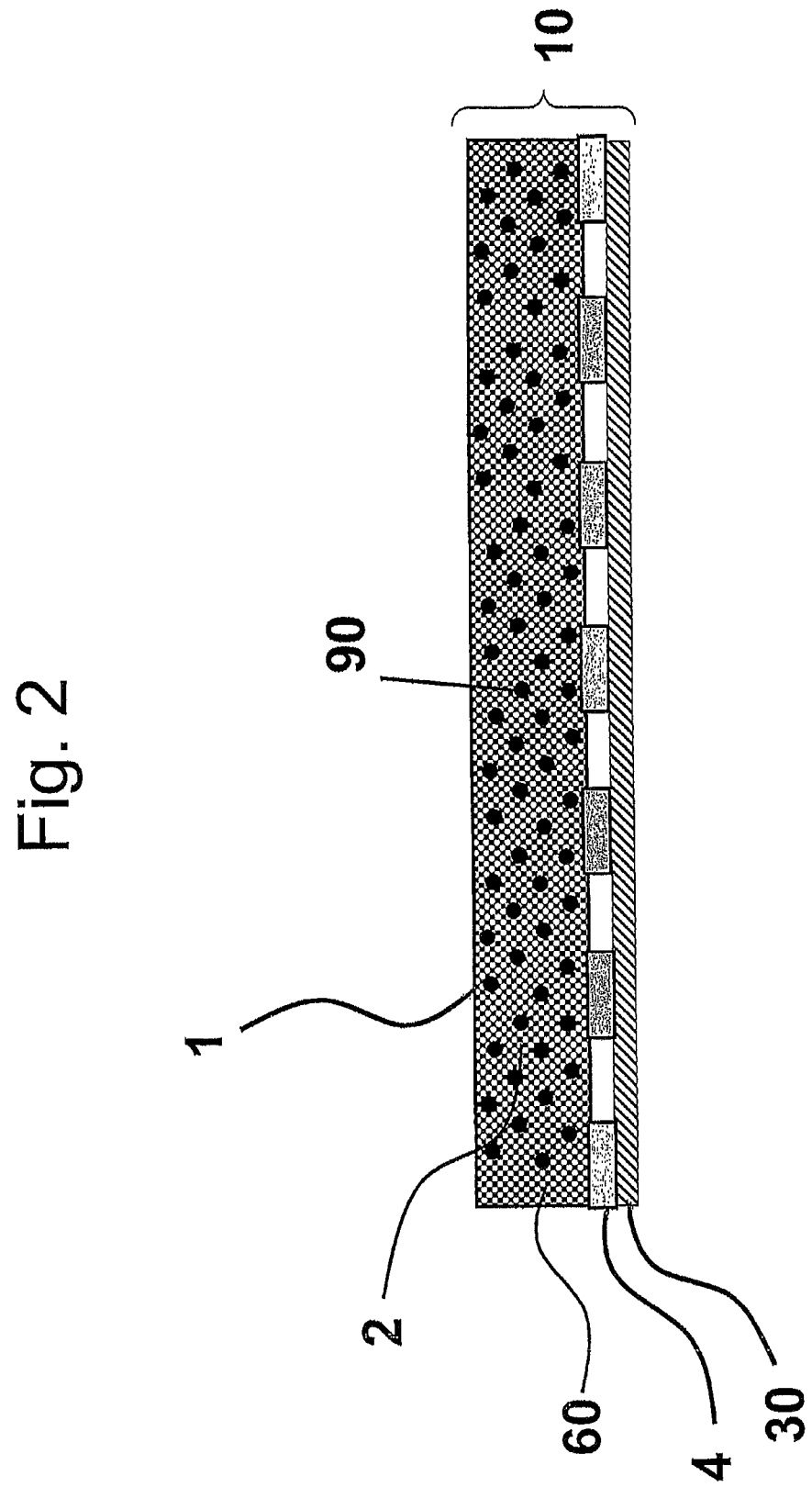
FIG. 2 is a cross-sectional view of a schematic of a selectively reflective construct.

In some embodiments, the colorant (60) is selected to achieve a particular nIR reflectance in addition to the desired visible reflectance of the selectively reflective construct (10). For example, reflecting and absorbing additives may be selected as a colorant and applied to the polymeric material (2) of the first component in a manner to achieve a desired level of both the color (visible) and nIR reflectance. In one embodiment, a first component comprising a microporous material, such as ePTFE, may be formed comprising nIR additives, such as carbon. The polymeric material used to form the microporous material may comprise one or more nIR additives, and can then be formed into a thermally transparent microporous film having a desired level of nIR reflection. nIR additives (90, 91, 92, 93) such as but not limited to carbon, metal, and $TiO_2$ can be added to the thermally transparent, visually opaque first substrate (1) to achieve specific nIR, SWIR, MWIR, or LWIR reflectance properties as illustrated in FIGS. 2 and 4.

Specific reflectance properties of the construct in the short wave infrared (SWIR) can also be obtained through the use of infrared (IR) additives, adjusting the pore size of the polymeric material, and/or adjusting the thickness of the polymeric material. Suitable performance for constructs has less than 70% reflectance in the SWIR (900 nm to 2500 nm).

Measurements of average thermal emissivity over broad spectral bands such as 3 µm-30 µm, are suitable for characterization of the thermally reflective layer. However, broad band measurements do not adequately characterize the specific performance of a construct in use. Constructs described herein are designed to provide specific spectral performance in narrower regions of interest, such as performance averaged over the wavelength range of 3 µm-5 µm (MWIR) or averaged over the wavelength range of 9 µm-12 µm average (LWIR). In some embodiments, specific spectral performance can be tailored to particular reflectances at specific wavelengths of interest within these ranges. Reflectance or transmission within the narrower ranges of 3 µm-5 µm and/or 9 µm-12 µm is considered thermal performance.

In one embodiment a multi-spectral, selectively reflective construct is provided having a thermal performance of an average reflectance of greater than or equal to about 25%, in the wavelength range of 3 µm to 5 µm, and/or an average reflectance of greater than or equal to about 25% reflectance in the 9 µm to 12 µm. In other embodiments, constructs are formed having an average reflectance of greater than or equal to about 30%, 40%, 50%, or 60% in the wavelength range of 3 µm to 5 µm, and/or an average reflectance of greater than or equal to about 30%, 40%, 50%, or 60% in the wavelength range of 9 µm to 12 µm. In certain embodiments, multispectral, selectively reflective constructs have a reflectance greater than 30% and less than 98%, less than 90%, or less than 80% in the wavelength ranges of 3 µm to 5 µm and/or 9 µm to 12 µm, when measured according to the test methods described herein.

Further with regard to FIG. 1, the multi-spectral, selectively reflective construct (10) comprises a second component comprising thermally reflective layer (30) comprising a low emissivity component (35) which imparts a high reflectance to the construct in the wavelength ranges of 3 µm to 5 µm and 9 µm to 12 µm. The thermally reflective layer has an emissivity of less than about 0.75, less than about 0.6, less than about 0.5, less than about 0.4, less than about 0.3, or less than about 0.2, when tested according to the Emissivity Measurement test method described herein. The low emissivity component (35) may be a coating or substrate with emissivity of less than about 0.75. Low emissivity components comprise metals including, but not limited to Ag, Cu, Au, Ni, Sn, Al, and Cr. Additionally, low emissivity components may comprise non-metal materials having an emissivity of less than about 0.75, less than about 0.6, less than about 0.5, less than about 0.4, less than about 0.3, or less than about 0.2, when tested according to the Emissivity Measurement test method described herein. Non-metal materials which may be suitable for use in the low emissivity component include indium-tin oxide, carbon nanotubes, polypyrol, polyacetylene, polythiophene, polyfluorene, and polyaniline. The thickness of the thermally reflective layer (30) may be selected to achieve certain properties. In one embodiment, where a flexible multi-spectral, selectively reflective construct is desired, the thickness of the thermally reflective layer (30) comprising a low emissivity component may be minimized, and a thermally reflective layer having a thickness of less than about 0.002 inch may be selected.

In one embodiment, the thermally reflective layer (30) may be comprised of a low emissivity component applied to the second surface (13) of the thermally transparent, visually opaque substrate (1) by metal vapor deposition or by a spray coating containing metal particles, such as a metallic spray paint. In a further embodiment, the thermally reflective layer (30) may be formed by bonding a low emissivity component (35) to the second surface (13) of the thermally transparent, visually opaque substrate (1), with an intervening layer (4), such as an adhesive or spacer material, as exemplified in FIG. 1. The thermally reflective layer (30) may comprise a low emissivity component, for example, in the form of a transfer foil.

Figure 7:
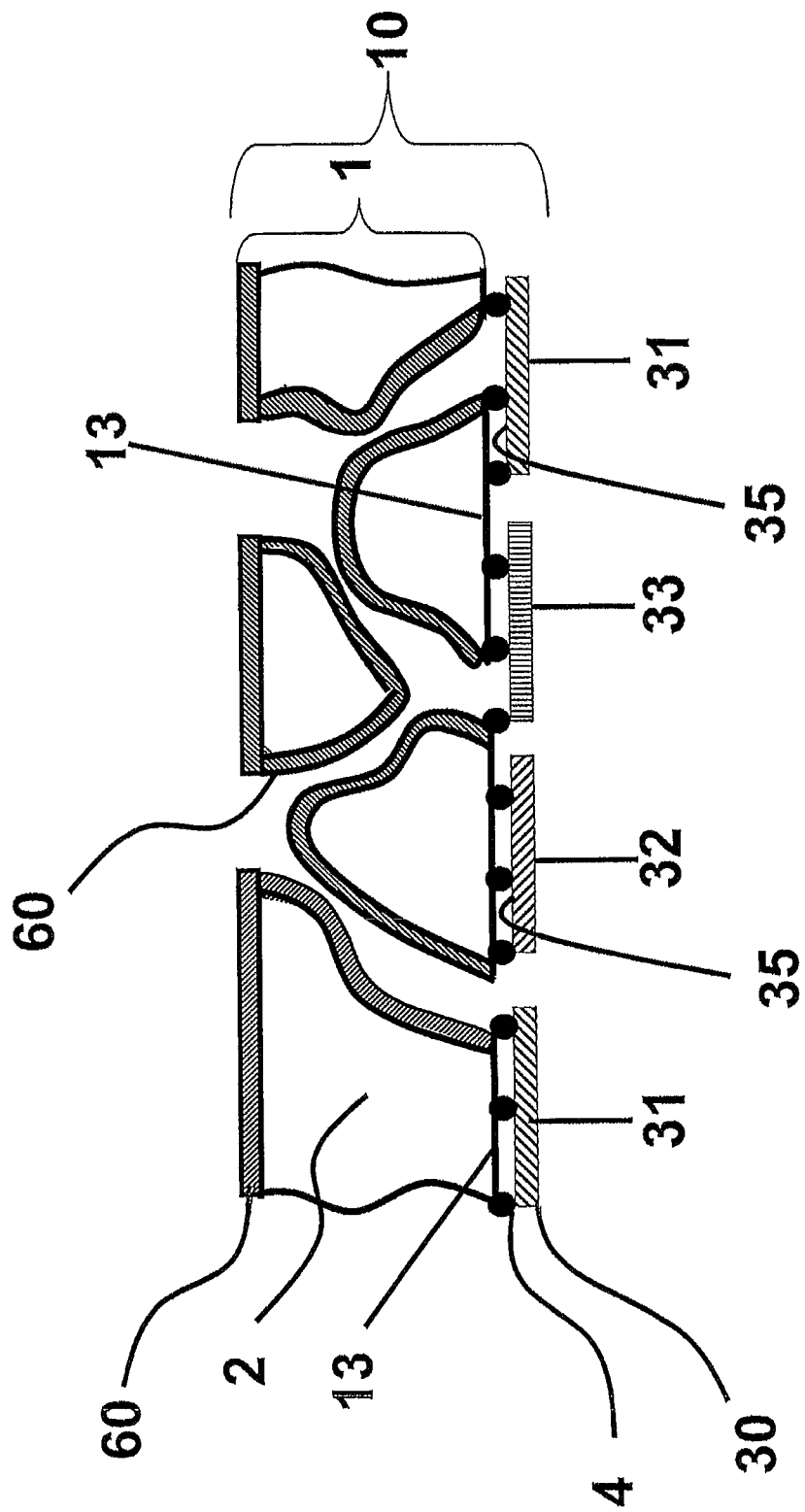
FIG. 7 is a cross-sectional view of a schematic of a selectively reflective construct.
Figure 8:
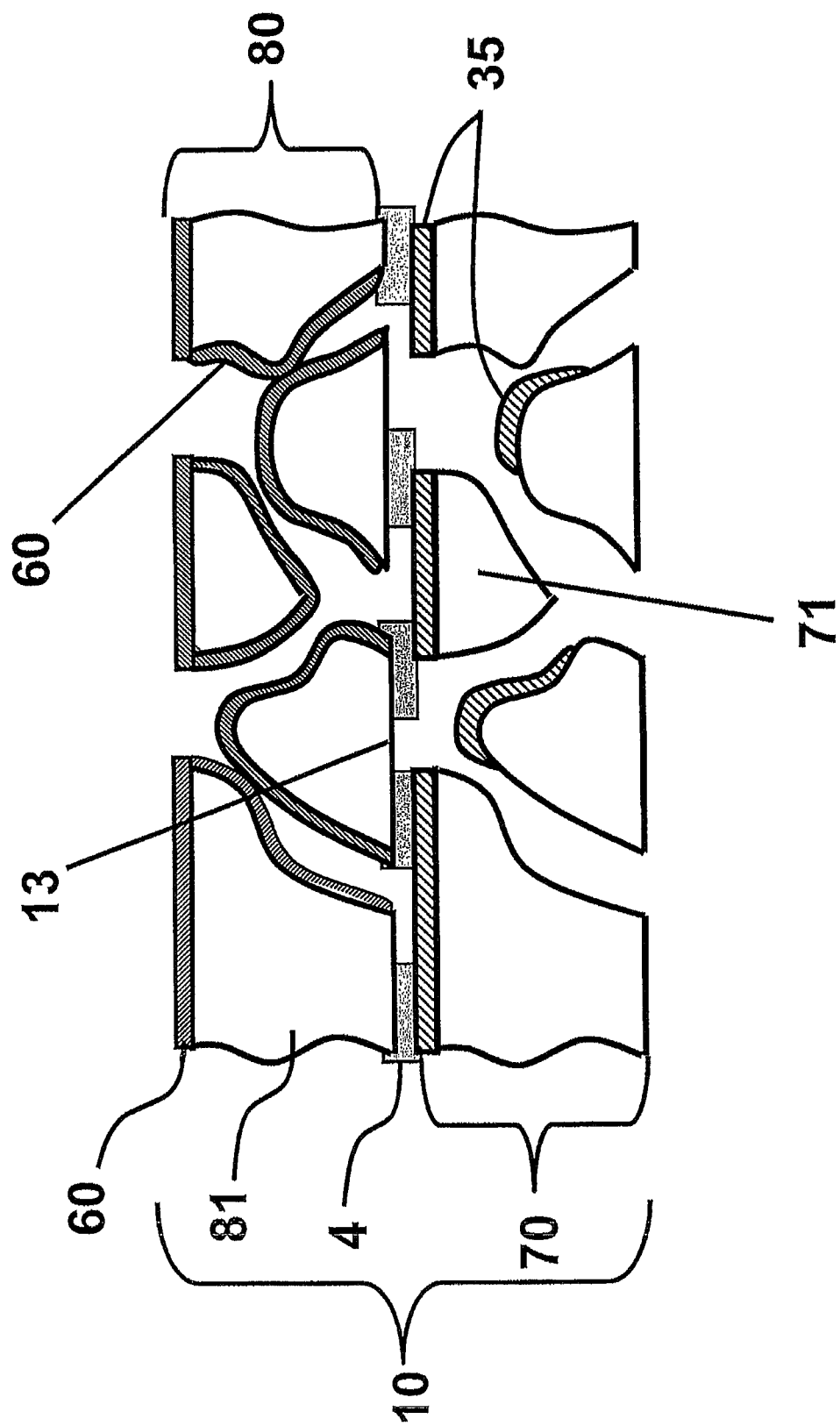
FIG. 8 is a cross-sectional view of a schematic of a selectively reflective construct.

In an alternate embodiment, such as exemplified in FIGS. 6 and 7, a thermally reflective layer (30) may comprise a low emissivity component (35) such as metal containing film, or a metal spray painted film which may be disposed behind or adhered to the second surface (13) of the thermally transparent, visually opaque substrate (1). The metallization of a suitable film can be accomplished by electroless plating techniques, by vapor deposition, or by the reduction of metal salts in or on the surface of a film.

Alternatively, metal-containing films suitable for this invention can be formed by metal-filled polymer extrusion, metal surface impregnation, or the lamination or encapsulation of metal films or particles. For example, as exemplified in FIG. 8, a construct (10) may comprise a first component (80) comprising a first substrate (81) that is the thermally transparent, visually opaque substrate, and a second component (70) comprising a second substrate (71). The second component (70) comprising a thermally reflective layer comprises a substrate (71), for example, a film such as expanded PTFE that has been metallized with a low emissivity component (35) and is adhered by an intervening layer (4) to the second surface (13) of the thermally transparent, visually opaque first substrate (81). In another embodiment, the second component (70) may comprise a metallized textile disposed adjacent the second surface (13) of the thermally transparent, visually opaque first substrate (81), and optionally attached to the first substrate (81).

In one embodiment, where the thermally reflective layer (30) is formed by affixing a low emissivity component to the second surface (13) of the thermally transparent, visually opaque substrate (1), an intervening layer (4) that is either continuous or discontinuous may be used. A multi-spectral, selectively reflective construct comprising a continuous thermally transparent intervening layer (4), such as an adhesive or spacer material, is exemplified in FIG. 1. Alternately, a discontinuous intervening layer (4) having sufficient thermal transparency to achieve the desired thermal properties of the multi-spectral, selectively reflective construct may be used. Multi-spectral, selectively reflective constructs having a discontinuous intervening layer (4), for example, are exemplified in FIGS. 2, 4, 5, 7, and 8.

In another embodiment, a multi-spectral, selectively reflective construct is provided wherein a second component comprising the thermally reflective layer (30) comprising a low emissivity component is positioned adjacent the second surface of the first component comprising the thermally transparent visually opaque substrate (1) with little or no attachment to the thermally transparent, visually opaque substrate. In one embodiment, a construct may be formed similar to the construct illustrated in FIG. 1, with no intervening layer (4). Adjacent, as used in the context of the present invention, means either (a) located immediately next to with no intervening layers, (b) adhered directly to, (c) adhered to with intervening layers, or (d) located on a particular side but separated from the other layer by intervening layers of another material. Provided the desired multi-spectral performance of the present invention is achieved, an embodiment can be made having one or more intervening layers of sufficiently thermally transparent material located between the second surface (13) of the thermally transparent, visually opaque substrate (1) and the thermally reflective layer (30). These layers can be either adhered to each other or not adhered to each other, or any combination thereof.

The thermally reflective layer may comprise a low emissivity component having a single emissivity over the entire surface of the thermally reflective layer (30), or alternately, a range of emissivities may be provided. In one embodiment, as exemplified in FIG. 7, the thermally reflective layer (30) may comprise multiple discrete low emissivity components (31, 32, 33) adjacent the second surface (13) of the thermally transparent, visually opaque substrate (1). In one embodiment the thermally reflective layer (30) may comprise a single continuous layer of a low emissivity component, or in an alternate embodiment, the thermally reflective layer (30) may comprise a discontinuous pattern of low emissivity components.

In some embodiments, the multi-spectral, selectively reflective construct (10) is thermally reflective and radar reflective. In other embodiments, the multi-spectral, selectively reflective construct (10) may be constructed to be thermally reflective while also being transparent to radar signal. Constructs may also be formed which are capable of transmitting radar waves, while providing attenuation in multiple portions of the electromagnetic spectrum such as vis, nIR, SWIR, MWIR and/or LWIR Some constructs can have 0% transmission at 1 to about 100 GHz, while other constructs provide 100% transmission at 1 to about 100 GHz.

A construct will be considered radar transparent, herein, if it is capable of transmitting radar waves and where the average of the transmission data collected in the range of 1 GHz to about 5 GHz is greater than about 90%, when tested according to the method provided herein. In other embodiments, a multi-spectral, selectively reflective construct (10) may be formed having an average radar transmission of greater than 90% the range from 1 to about 20 GHz, when tested according to the method provided herein, and/or an average transmission greater than 90% the range from about 1 to about 100 GHz. Constructs may also be formed having an average transmission greater than 95%, or greater than 98%, or greater than 99%, in the ranges from 1 GHz to about 5 GHz, or 1 GHz to about 20 GHz, when tested according to the methods provided herein.

Advantageously, in certain embodiments, constructs (10) are provided which are thermally protective, having an average reflection of greater than 25% in the wavelength ranges of 3 um-5 um, 9 um-12 um, or both MWIR and LWIR wavelength ranges, while also having a radar transmission greater than 90%, or greater than 95%, or greater than 98% or greater than 99%, throughout the frequency ranges of 1-5 GHz, 1-20 GHz, or both ranges, when tested according to the methods provided herein for thermal reflection and radar transparency.

One radar transparent, multi-spectral selectively reflective construct suitable for use in providing detection protection comprises a first substrate comprising a microporous polymeric substrate having a colorant on at least a first surface and a second surface that is opposite the first surface. A second substrate is provided that comprises a metallized film or transferred metallized film, wherein the first substrate and the second substrate are arranged so that the metal of the metallized film is oriented toward a second surface of the first substrate. In one embodiment, the second substrate is a metallized microporous polymeric substrate. The metal of the metallized film may comprise, for example, at least one of, but not limited to, aluminum (Al), copper (Cu), gold (Au), silver (Ag), nickel (Ni), tin (Sn), zinc (Zn), lead (Pb), and chromium (Cr), and alloys thereof. Where radar transparency is desired, it may be desirable for the metal layer deposited on a polymeric substrate to have a thickness of less than 1 µm, less than 500 nm, less than 400 nm, or less than 200 nm, when tested according to the method provided herein for determining metal thickness. The first and second substrates may be affixed, such as by sewing, lamination, or otherwise adhering the two substrates together. The construct may further be laminated to a textile backer layer.

One embodiment described herein comprises construct comprising a front surface and a back surface, a first substrate and a second substrate, where both substrates comprise microporous expanded polytetrafluoroethylene (ePTFE). In one embodiment, the first substrate comprises a thermally transparent visually opaque layer that has a first surface that is comprised of microporous ePTFE comprising a colorant and corresponds to the front surface of the construct, and a second surface. The second substrate comprises a metallized ePTFE, wherein the metal may comprise, for example, vapor deposited metal in one embodiment, or metal deposited by spray in another embodiment. The first and second substrates are arranged so that the metallized surface of the second ePTFE layer is adjacent the second surface of the first substrate.

Advantageously, constructs can be formed that are oleophobic, having an oil rating greater than 1, or greater than 2, or greater than 3, or greater than 4, or greater than 5, or greater than 6.

Importantly, constructs of the present invention can be formed that are lightweight, weighing less than 200 grams per square meter (gsm). Some preferred multi-spectral, selectively reflective constructs of the present invention may weigh less than 150 gsm, preferably less than 100 gsm, and more preferably less than 50 gsm. In some instances where greater durability is desired, a heavier weight backer is used which will increase the total construct weight. For example, in one embodiment, a 250 gsm backer textile applied to a construct provides a total construct weight that may be between about 270 gsm and 450 gsm.

Protective coverings can be made from a radar transparent, multi-spectral, selectively reflective construct (10) for covering articles such as, for example, equipment, shelters such as tents, and vehicles that are already provided with radar camouflage. The protective covers can add visible, nIR, MWIR and/or LWIR signature protection to an article, while advantageously maintaining the radar signature reduction capabilities of these articles due to the radar transparency of the cover.

Figure 12:
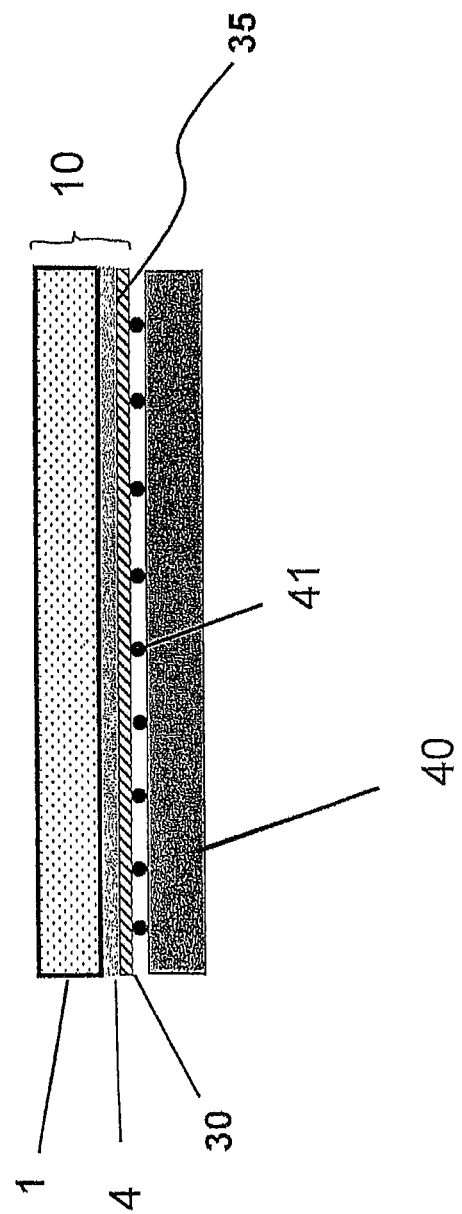
FIG. 12 is a cross-sectional view of a schematic of a selectively reflective construct further comprising a radar camouflaging layer.

In a further embodiment, a multi-spectral selectively reflective construct (10) that is radar transparent may comprise at least one additional layer (40) that is radar camouflaging as exemplified by the cross-sectional illustration of FIG. 12. By radar camouflaging, it is meant that the at least one additional layer absorbs, reflects and/or scatters radar signal within the frequency range of about 1-5 GHz, about 1-20 GHz, or about 1-100 GHz. The radar camouflaging layer may provide complete absorption, reflection or scattering of the radar signal; or the radar camouflaging layer may provide selective or patterned absorption, reflection or scattering of the radar signal. The radar camouflaging layer (40) may optionally be affixed to the multi-spectral selectively reflective construct (10) to the thermally reflective layer (30) by an attachment means (41). Attachment means may be by lamination techniques, adhesive, sewing, and the like. Alternatively, the radar camouflaging layer (40) may be a separate layer, separated from a multi-spectral, selectively reflective construct by air or other radar transparent layers. A variety of radar camouflaging layers may be suitable to provide protection depending upon the desired level of radar protection. Materials which may be suitable include but are not limited to carbon and/or metal powders that are incorporated, for example, as a coating on a substrate, fibers, foams, and/or polymeric composites. Examples may be found in U.S. Pat. Nos. 5,922,986; 5,312,678; 6,224,982; and 5,185,381.

Figure 5:
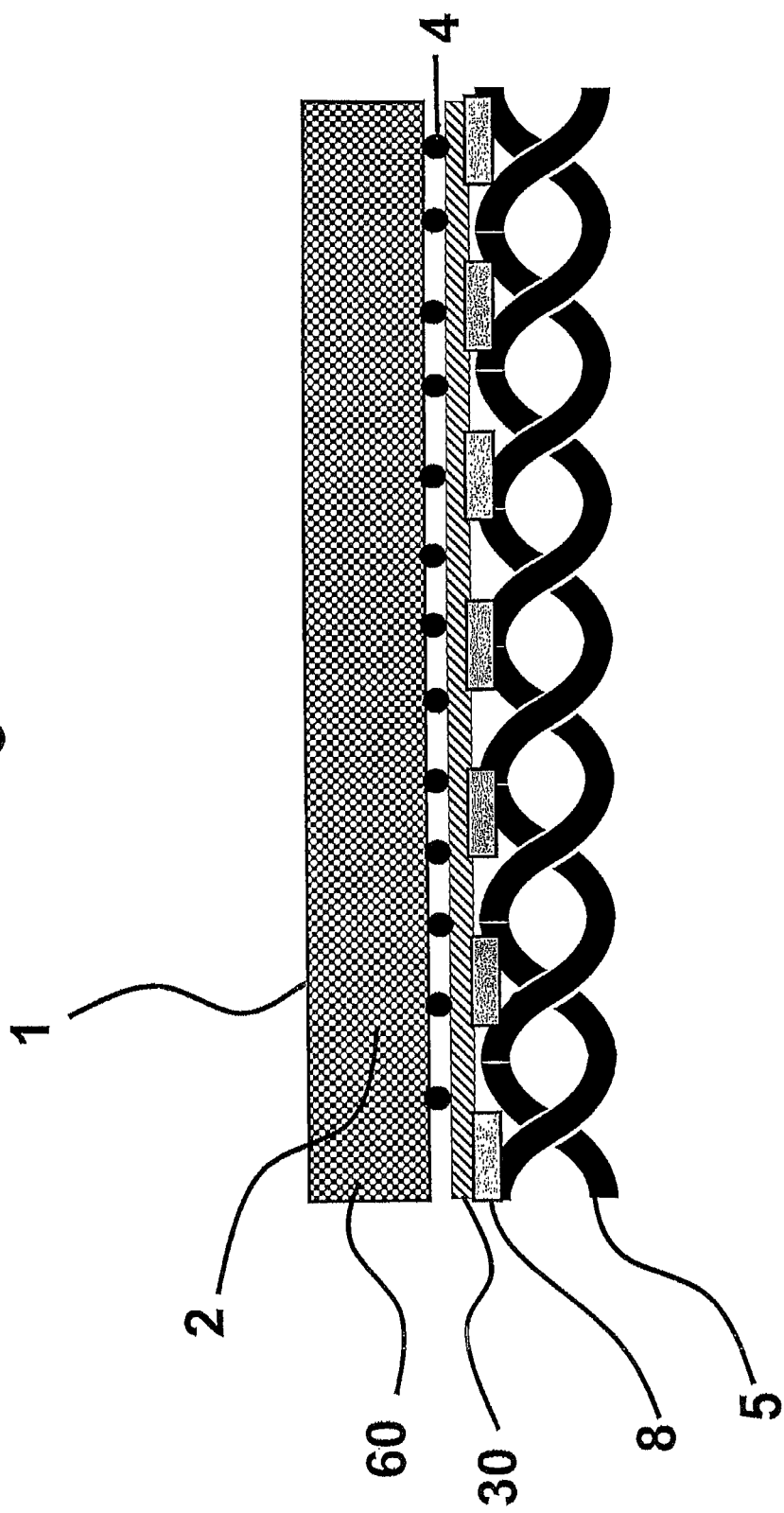
FIG. 5 is a cross-sectional view of a schematic of a selectively reflective construct.

For applications where properties are desired, such as liquidproofness, flame retardancy, or chemical and biological agent protection, the multi-spectral, selectively reflective construct may comprise one or more substrate backers (5) adjacent the side of the thermally reflective layer (30) that is the side opposite the first substrate (1). As exemplified in FIG. 5, a porous substrate backer (5) may optionally be provided to one side of the thermally reflectively layer (30) of the multi-spectral, selectively reflective construct. This embodiment further enhances the utility of the present invention by providing enhanced properties to the construct independent of the visual, nIR and thermal reflection properties. As illustrated in FIG. 5, a textile layer may serve as a porous substrate backer (5), which may be attached by attachments (8), such as by adhesive bonds to the of the thermally reflective layer, for example, to improve abrasion resistance or tear strength. Textiles are particularly suitable for use as a porous substrate backer (5) and may be tailored to provide improved durability, structural or dimensional stability, flame retardancy, insulation, and the like, to the multi-spectral, selectively reflective construct while maintaining comfort and aesthetics. Suitable textiles for such purposes include, but are not limited to, wovens, knits, and non-wovens. In another embodiment of the present invention, the porous substrate backer (5) may comprise a porous or microporous film such as expanded PTFE. Porous or microporous films can provide protection to the low emissivity layer while maintaining breathability.

The construct breathability as measured by MVTR test method described herein is desirably greater than 1,000 (g/m$^2$/day). Breathability of greater than 2,000 (g/m$^2$/day), greater than 4,000 (g/m$^2$/day), greater than 6,000 (g/m$^2$/day), greater than 8,000 (g/m$^2$/day), and even greater than 10,000 (g/m$^2$/day) can be achieved for constructs described herein.

The multi-spectral, selectively reflective construct (10) once assembled may be used in a wide variety of applications including but not limited to garments, coverings, shelters, hides, and netting. Articles comprising these constructs may be made using a single ply of the multi-spectral, selectively reflective construct or with a plurality of plies to provide the appropriate depth of view and reflectance characteristics. For example, in one embodiment of a garment application, in which the wearer of a garment is to be concealed, it may be advantageous to provide multiple layers of narrowly cut multi-spectral, selectively reflective construct material (i.e. 1"×4" strips) on another layer of the selectively reflective construct which forms the body of the garment. This provides for greater visual disruption of the wearer's silhouette while providing enhanced thermal reflective performance.

Articles comprising the multi-spectral selectively reflective constructs are formed having a front surface and a back surface wherein the front surface is oriented towards the potential source of detection. The back surface, which is opposite the front surface, is generally oriented towards the object or body to be shielded from detection. The construct comprises a first component that is the thermally transparent, visually opaque substrate, and a second component that is the thermally reflective layer wherein the thermally transparent, visually opaque substrate is positioned between the source of detection and the thermally reflective layer. The thermally reflective layer is positioned between the thermally transparent, visually opaque layer and the object or body to be shielded from detection. Therefore, where the article comprises, for example, a tent, a garment, a shelter, or protective covering, the first component of the construct corresponds to, or is proximate, the outer surface of the article, and the second component of the construct corresponds to, or is proximate, the inner surface of the article and therefore, proximate the object or body to be shielded from detection.

The thermal performance properties of articles comprising the multi-spectral, selectively reflective constructs described herein may be further enhanced by selectively applying insulating materials or insulating composites between the wearer/equipment being protected from thermal detection, and the multi-spectral, selectively reflective construct layer. For example, in one embodiment a garment is formed comprising the multi-spectral selectively reflective composite that further comprises an insulating material provided, for example, to areas of the garment corresponding to the shoulder area, to minimize hot spots on the garment, and reduce thermal signature. Where the need exists to reduce thermal signature over long periods of time (e.g., in excess of a 24 hour period), high performing insulation materials, such as those taught in commonly owned U.S. Pat. No. 7,118,801, may be preferred. These insulation materials may also be suitable to mask hot portions of the equipment (such as the engine compartment) and may be used in combination with a cover made from the multi-spectral, selectively reflective construct material described herein which will further mask thermal signature and provide visual and nIR image suppression.

In alternate embodiments, the multi-spectral, selectively reflective construct of the present invention may have a thickness less than about 20 mm, and preferably less than about 10 mm, and more preferably less than about 7 mm, and even more preferably less than about 5 mm. Where thinner constructs are desired, a multi-spectral, selectively reflective construct may have a thickness less than about 3 mm, or even less than 1 mm.

In alternate embodiments, the multi-spectral, selectively reflective construct of the present invention may have a weight less than about 20 oz/yd$^2$, and preferably less than about 15 oz/yd$^2$, and more preferably less than about 10 oz/yd$^2$, and even more preferably less than about 7 oz/yd$^2$.

In alternate embodiments, the multi-spectral, selectively reflective construct of the present invention may have a hand less than about 3,000 gm, and preferably less than about 2,000 gm, and more preferably less than about 1,000 gm, and even more preferably less than about 500 gm. Some multi-spectral, selectively reflective constructs of the present invention may have a hand less than about 300 gm, preferably less than 150 gm, and more preferably less than 100 gm.

Test Methods

Liquidproof Test

Liquidproof testing was conducted as follows. Material constructions were tested for liquidproofness by using a modified Suter test apparatus with water serving as a representative test liquid. Water is forced against a sample area of about 4¼-inch diameter sealed by two rubber gaskets in a clamped arrangement. For samples incorporating one or more textile layers, a textile layer is oriented opposite the face against which water is forced. When a non-textile sample (i.e., film not laminated to a textile layer) is Suter tested, a scrim is placed on the upper face of the sample (i.e., face opposite the face against which water is forced) to prevent abnormal stretching of the sample when subjected to water pressure. The sample is open to atmospheric conditions and is visible to the testing operator. The water pressure on the sample is increased to about 1 psi by a pump connected to a water reservoir, as indicated by an appropriate gauge and regulated by an in-line valve. The test sample is at an angle, and the water is recirculated to assure water contact and not air against the sample's lower surface. The upper face of the sample is visually observed for a period of 3 minutes for the appearance of any water which would be forced through the sample. Liquid water seen on the surface is interpreted as a leak. If no liquid water is visible on the sample surface within 3 minutes the sample is considered as having passed the Liquidproof test (Suter test). A sample passing this test is defined as "liquidproof" as used herein.

Hand Test

Hand was tested on test samples using a Thwing-Albert Handle-O-Meter (model #211-5 from Thwing Albert Instrument Company, Philadelphia, Pa.). A set, beam load was used to force test specimens through a ¼ inch slot. A load of 1000 grams was used when testing laminate samples. The instrument measures the resistance force which is related to the bending stiffness of the sample and displays the peak resistance digitally. In order to adequately quantify the directionality and the asymmetry of the samples, different samples are cut for bending against the X-direction and Y-direction, respectively. Four inch squares are cut from the material to be tested.

In a typical test, an X-direction sample is placed on the equipment such that the X-direction runs perpendicular to the slot. With the sample construct face up, the test is initiated, causing the beam to lower and the sample to be forced through the slot on the test table. A peak resistance number is displayed and recorded as "sample construct face up". The same sample is subsequently turned over and rotated 180 degrees to bend a different site. In this new configuration, again the test is initiated causing the sample to be forced through the slot. The second resistance number is recorded as "sample construct face down". The procedure is repeated for a Y-direction sample (in which the Y-direction is oriented perpendicular to the slot), generating two more numbers: "sample construct face up" and "sample construct face down".

The resultant four numbers (X-direction and Y-direction, sample construct face up and sample construct face down) are added to provide a total hand number in grams (gm) which characterizes the stiffness of the sample (taking into account asymmetry and directionality). At least two such total hand numbers were generated and averaged to arrive at the reported hand number.

Moisture Vapor Transmission Rate (MVTR)

A description of the test employed to measure moisture vapor transmission rate (MVTR) is given below. The procedure has been found to be suitable for testing films, coatings, and coated products.

In the procedure, approximately 70 ml of a saturated salt solution consisting of 35 parts by weight of potassium acetate and 15 parts by weight of distilled water was placed into a 133 ml polypropylene cup, having an inside diameter of 6.5 cm at its mouth. An expanded polytetrafluoroethylene (PTFE) membrane having a minimum MVTR of approximately 85,000 g/m$^2$/24 hrs. as tested by the method described in U.S. Pat. No. 4,862,730 (to Crosby), was heat sealed to the lip of the cup to create a taut, leakproof, microporous barrier containing the solution.

A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the first substrate was oriented away from the waterbath, and the opposing surface was in contact with the expanded polytetrafluoroethylene membrane mounted to the surface of the water bath and allowed to equilibrate for at least 15 minutes prior to the introduction of the cup assembly. The cup assembly was weighed to the nearest 1/1000 g and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The MVTR of the sample was calculated from the weight gain of the cup assembly and was expressed in grams of water per square meter of sample surface area per 24 hours.

Reflectance Test Method for Visible and Near Infrared Spectra

The spectral near normal-hemispherical reflectance of the samples (for example, the colored side of the first substrate of a construct) in the visible and near infrared (nIR) spectral range was measured using UV/VIS/nIR spectrophotometer (Perkin-Elmer Lambda 950) fitted with a 150 mm diameter, integrating sphere coated with Spectralon® (Labsphere DRA 2500) that collects both specular and diffuse radiation. The reflectance measurements are made with double beam mode of operation and Spectralon® materials were used as references from 250 nm to 2500 nm at 20 nm intervals.

The samples were measured as a single layer with a backer. The backers used were dull black coated polymer sheets. Measurements were taken on a minimum of three different areas and the data of the measured areas was averaged. In this work, all the measurements were performed for near normal incidence, i.e. the sample was viewed at an angle no greater than 10 degrees from the normal, with the specular component included. The Photometric accuracy of the spectrophotometer was calibrated to within 1 percent and wavelength accuracy within 2 nm with a standard aperture size used in the measurement device. To compensate for the signal loss due to the backer material, the sample reflectance was calculated according to ASTM:E903-96 standard test method for Reflectance of materials using integrating sphere.

The results from the spectrophotometer measurement in the visible and near infrared ranges are reported in Table 1 in terms of average hemispherical reflectance for a particular wavelength range. of all data points collected.

Test method for Hemispherical Reflectance and Transmittance Over the Thermal Infrared Spectral Range Spectral near normal-hemispherical transmittance and reflectance in the thermal infrared spectrum is of great importance for the design and evaluation of this invention. The measured hemispherical reflectance and transmittance spectra can be used to compute directional emissivity via Kirchhoff's law ($\epsilon$=1−R−T; for opaque substrates, $\epsilon$=1−R [where $\epsilon$ is emittance, R is reflectance, & T is transmittance).

To measure the direction-hemispherical transmittance and reflection, the samples were viewed at an angle no greater than 10 degrees from the normal, with the specular component included. Measurements were made of the spectral hemispherical transmittance and reflectance of the samples over the range 600 cm$^{-1}$ to 5000 cm$^{-1}$, with a spectral resolution of 8 cm$^{-1}$. The optical radiation source and wavenumber selectivity were provided by a Bio-Rad FTS-6000 Fourier-Transform Infrared (FTIR) spectrophotometer, which was configured with a ceramic-coated globar source and a Ge-coated KBr beam splitter. The hemispherical measurement geometry is implemented by using a diffuse-gold coated 150 mm diameter integrating sphere (Mid-IR IntegratIR-Pike Technologies), with the samples mounted on a port cut into the surface of the sphere. A liquid-nitrogen-cooled MCT detector is mounted on top of the sphere with its field of view restricted to a portion of the bottom surface of the sphere. The Mid-IR Integral IR features an 8 degree illumination of the sample and reflectance samples are placed directly onto the sample port of the upward-looking sphere or over a thin infrared transmitting window.

For reflectance measurement, square sections of samples approximately 40 mm$^2$ were cut and mounted onto an 18 mm horizontal reflectance sampling port on the integrating sphere. A diffuse gold reference standard was used in the measurement and all the samples were placed on a backer material made of dull black paint coated polymer. The spectrum of each sample was collected with a rapid scan mode and 200 scans per sample. Three readings were taken for each sample and the resulting data averaged. To compensate for the signal loss due to the backer material, the sample reflectance was calculated according to ASTM:E903-96 standard test method for Reflectance of materials using integrating sphere.

Transmittance of transparent or translucent materials in the region from 2 μm to 17 μm was measured by placing the sample at the transmission station accommodating a standard 2"×3" sample holder. The instrument was then set in the absolute measurement (100%) position, and the 100% signal without the sample in the measurement position is recorded. The sample was then placed into position and the transmitted reading is recorded. The transmitted signal divided by the 100% signal equals the transmittance.

Table 1 contains the directional-hemispherical transmittance and reflectance data of all data points collected, averaged over the spectral ranges 3 μm-5 μm and 9 μm-14 μm.

Transmission Optical Density Test Method

For the purpose of this patent, visual opacity will be measured in terms of optical density (OD).

The transmission optical density at room temperature of the samples was measured with a desktop densitometer model TRX-N instrument supplied by the Tobias Associates, Inc., Ivyland Pa. U.S.A. The device consists of a light source and a silicon photodetector with a spectral response of greater than 20% between 475 nanometers and 675 nanometers. This device is capable of measuring the optical density of films in both transmission and reflection modes. Transmission mode was used for all measurements.

Optical density is a measurement that approximates the response of the human eye. Optical density is defined by the following equation:

OD=Log 1/T where, OD=optical density, and T=transmission.

The instrument requires around 10 minutes of warm up time. The test area is approximately 3 mm in diameter, and the samples to be measured were large enough to completely cover the test area, The test procedure is as follows
1. Place 0.0075 inch thick PET film standard over sample port.
2. Zero is set by lowering the detector arm to the light port and pressing the control button.
3. The digital readout should read zero.
4. Record the result.
5. Place the test sample on the light table so that it covers the light port.
6. Lower the detector arm to the sample covering the light port and press the control button.
7. Read and record cord the result from the LED display.
8. Repeat steps 5 through 8 for the remaining samples.

The optical density measurement is displayed on three 7 segment light emitting diode display units, one for each digit. For the purpose of this patent, a material will be considered visibly opaque when the OD is greater than 0.30 between 475 and 675 nm.

Emissivity Measurement Test Method

The infrared emittance near room temperature of the samples was measured with a portable emissometer model AE instrument supplied by the Devices & Services Company, (Texas, U.S.A). This emittance device determines the total thermal emittance, in comparison with standard high and low emittance materials.

The Devices & Services emissometer, model AE, consists of a measuring head and a scaling digital voltmeter. The measuring head is designed so that its radiation detector is heated to 355K, allowing the test samples to remain at ambient temperature during measurement. The radiation detector is a differential thermopile with two high-$\epsilon$ and two low-$\epsilon$, and thus responds only to heat transferred by radiation between itself and the sample. The detector has a near-constant response to wavelengths of infrared radiation and views a 50-mm diameter area of a sample from a distance of 4.3 mm. The manufacturer specifies that the output voltage of the detector is linear with $\epsilon$ to within ±0.01 units and is proportional to $T_d^4 - T_s^4$, where $T_d$ and $T_s$ are the absolute temperatures of the detector and test sample, respectively. Two "standards", each 66.7 mm in diameter and 4 mm thick, are supplied with the emissometer and have $\epsilon$'s of 0.06 and 0.90. The instrument requires around 60 minutes of warm up time. Because the emissometer is comparative, it must be calibrated before use. The two standards are placed on the heat sink so that both of them attain the ambient temperature.

The detector head is then placed over the high emissivity standard and the gain of the voltmeter is adjusted so that it reads 0.90, after allowing about 90 seconds for equilibration. The detector head then placed over the low emissivity standard and the offset trimmer is adjusted such that the voltmeter reads 0.06. The adjustments are repeated until the emissometer may be moved from one standard and the other and the voltmeter readings indicate the two values without any adjustment.

To determine emissivity, a sample is cut in form and size similar to the standards and then placed on the heat sink and allowed to equilibrate with it. The detector head is placed over it and the reading of the voltmeter directly gives the hemispherical emittance of the test surface. The emissometer model AE instrument measures the hemispherical emittance approximately in the 3-30 µm wavelength ranges.

Radar Transparency

The radar transparency test of select examples of the present invention was conducted in accordance with ASTM Test Method D 4935-99. The standard fixture of this test method, having a test region with inside diameter of 1.3 inches and an outside diameter of 3.0 inches, provided average loss in dB from about 1 GHz to about 5 GHz, The radar transmission measurements from 1 GHz to 20 GHz were conducted in a substantially similar manner with the following exception. Instead of the standard test fixture, a 7 mm diameter coaxial cable connector was used as the test fixture. For this 1 GHz to 20 GHz test, a two-port vector network analyzer (VNA) with coaxial test cables attached to each port. At the device under test (DUT) end of each cable would be a general precision grade coaxial connector of size 7 mm, based on the IEEE Std 287-2007. The VNA is setup to sweep from 500 MHz to 20 GHz, using 401 data points and the test cables or connected together as a "through" connection. The output is set to S21-LOGMAG, or the insertion loss in dB, and a "response" type calibration is performed. The test cables are then separated and the sample (cut to a ½ inch diameter) is placed over the 7 mm interface and the test cables are reconnected.

The samples were measured as described above to obtain transmission data averaged from the range of 1 to 5 GHz and from the range 1 to 20 GHz, Samples were deemed radar transparent if the average transmission throughout the measured range was greater than 90%.

Samples of material prepared according to examples provided herein were tested, the loss in dB was recorded, and average radar percent transmission was calculated by the following equation:

% Transmission=$[10^{(dB\ loss/10)}] \times 100$

The percent transmission in the reported ranges was reported in Table 3.

Oil Repellency Test

In these tests, oil rating was measured using the AATCC Test Method 118-1983 with the following modification. Because the second surface of the visually opaque, thermally transparent component of the present invention is typically attached to the thermally reflective component, only the first surface of the visually opaque, thermally transparent component could be tested. Thus, the oil ratings reported herein are the result of measurements made on first surface of the visually opaque, thermally transparent component of the construct. Three drops of the test oil are placed on the sample surface. After 3 minutes, a numerical oil rating is assigned for the sample that corresponds to the highest number oil that does not wet/absorb into the sample. Higher numerical values indicate better oil repellency for the samples tested. Values of 2 or more, 4 or more, 5 or more, and even 6 or more, are preferred where oil repellency is desired.

Metal Thickness Test

The metal thickness of the thermally reflective layer and of the radar reflective layer, where applicable, was measured via an indirect method for samples prepared by physical vapor deposition using equipment and processes well known in the art. The thickness was determined by Inficon Sentinal III quartz crystal monitor that provides a deposition rate in angstroms per second. Based on the deposition time, the nominal thickness was calculated by multiplying the deposition time by the deposition rate.

For samples having metal foil as the thermally reflective layer, the metal foil thickness was measured using a Mitutoyo No. 2804F-10 micrometer prior to incorporation in the construct.

EXAMPLES

Example 1

A sample of a construct was prepared comprising carbon-coated ePTFE and metallized ePTFE, in the following manner.

A first component comprising carbon-coated ePTFE representing the first substrate was prepared as described in Example 3 of U.S. Patent Application Publication No. 2007/0009679 with the following exceptions. The ePTFE membrane used had a thickness of about 30 µm, a weight of about 9 grams per square meter, and an average pore size of about 0.2 µm. The amount of carbon black used was about 0.9% by weight of ePTFE membrane. Optical density and thermal reflection properties of the first substrate of the first component were measured according to the test methods herein, and reported in Table 1.

A second component comprising metallized ePTFE was prepared in accordance with U.S. Pat. No. 5,955,175, representing the thermally reflective layer. Emissivity was measured on the metallized side according to the test methods herein, and reported in Table 1. The metal thickness of the metalized ePTFE of the thermally reflective layer was calculated to be about 200 nm.

The first component was then placed against the metallized side of the second component, and a 0.5 mil layer of polyethylene film was placed in between. The layers were bonded together using a Geo Knight and Co. Model 178SU Heat Press at about 350° F. for about 10 seconds to form a construct. Multi-spectral test results for sample constructs prepared according to this example, and measured from the carbon-coated ePTFE side of the sample, are shown in Table 1 and shown in FIGS. 9, 10, and 11. The constructs had a visible reflection of approximately 8%, a nIR reflection of approximately 12%, a MWIR reflection of approximately 28%, and a LWIR reflection of approximately 50% as reported in Table 1.

Figure 9:
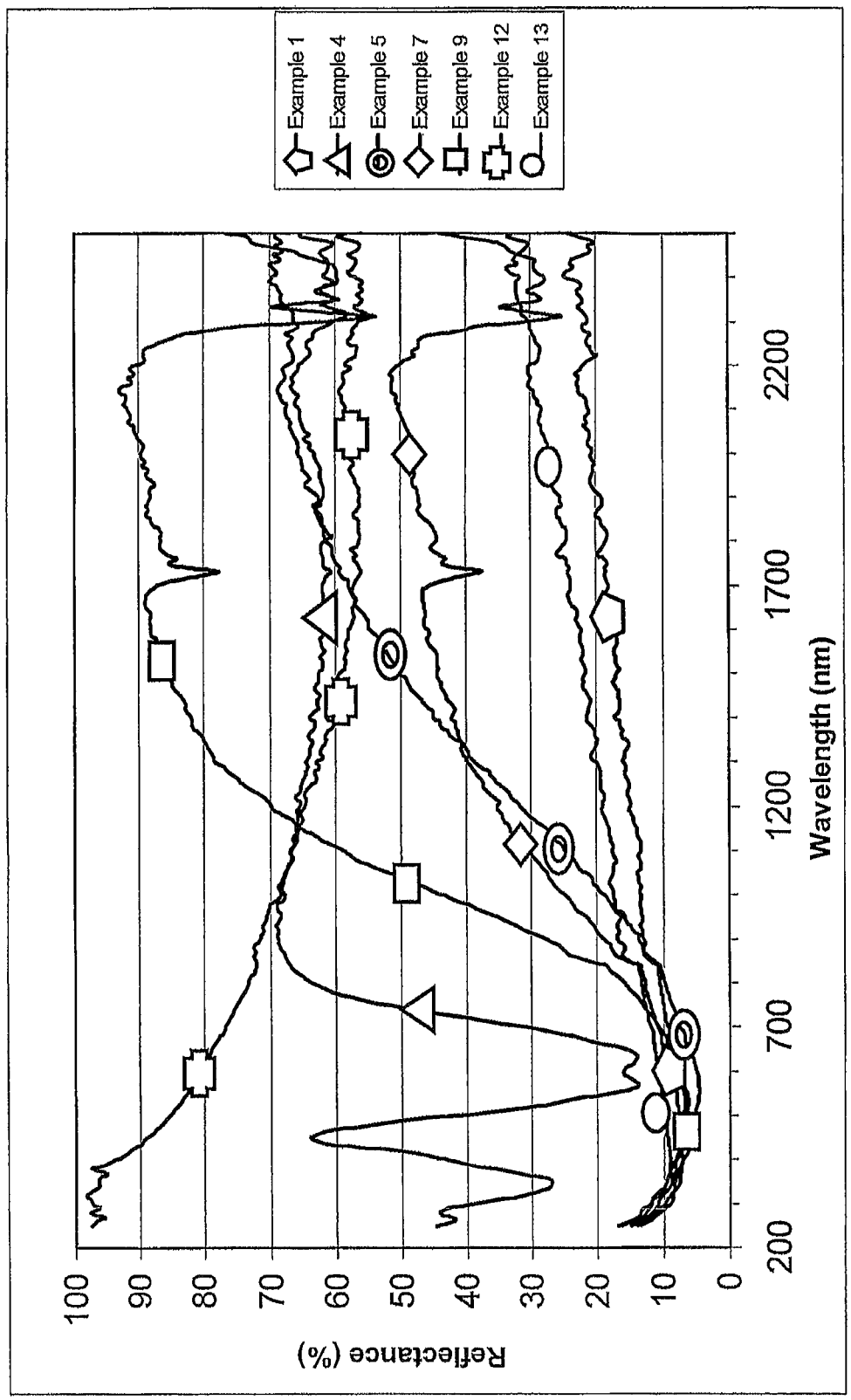
FIG. 9 is a reflectance spectra of several examples of constructs from 250 nm to 2,500 nm wavelengths.
Figure 10:
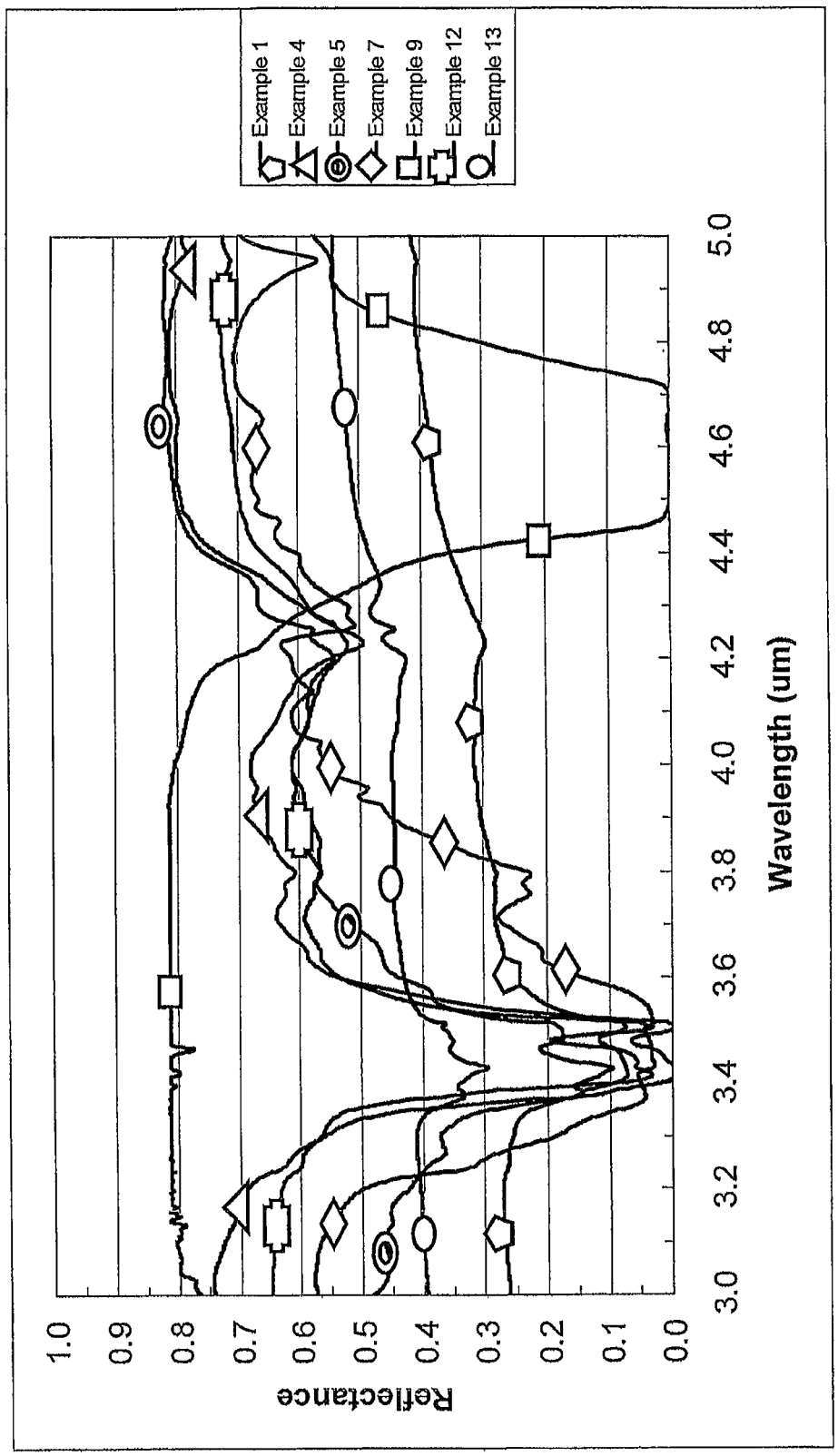
FIG. 10 is a reflectance spectra of several example constructs from 3.0 µm to 5.0 µm wavelengths.
Figure 11:
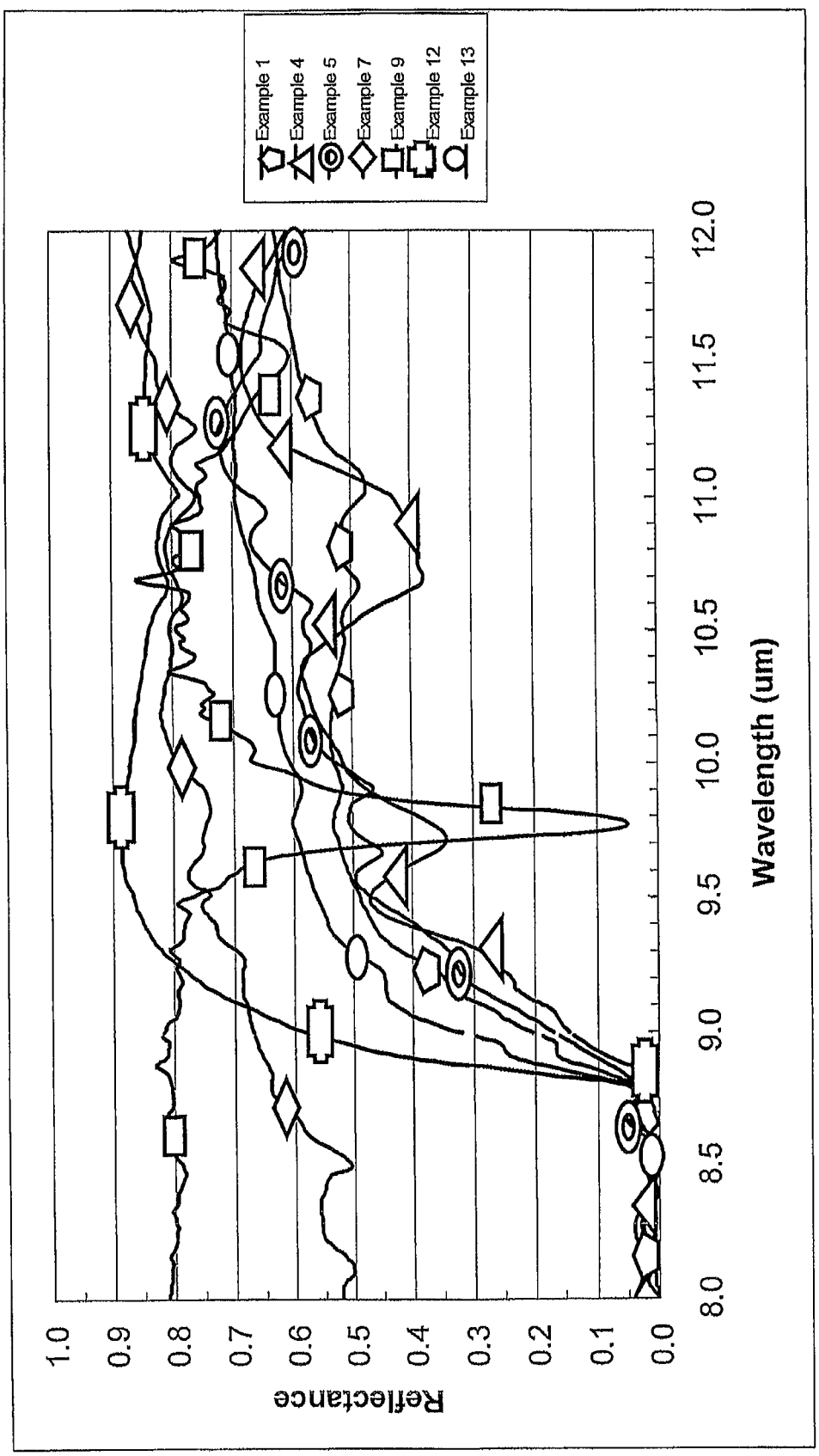
FIG. 11 is a reflectance spectra of several example constructs from 8.0 µm to 12.0 µm wavelengths.

The spectral response curves in FIGS. 9, 10, and 11, show the variability of reflectance and transmission over the broad range of wavelengths tested. The average results reported are calculated from the data in these figures over the specific wavelength ranges reported in Table 1. FIG. 11 additionally includes reflectance data on constructs from about 8 µm to about 9 µm.

Example 2

A sample of a construct was prepared comprising a layer of carbon-coated ePTFE, Al foil, and a textile backer as follows.

A first component of carbon-coated ePTFE was prepared as described in Example 1, representing the first substrate. Optical density and thermal transmission properties of the first substrate were measured according to the test methods herein, and reported in Table 1.

A second component was prepared comprising a discontinuous layer of foil adhered to a textile backer, representing the thermally reflective layer. The second component was formed by perforating a layer of Al transfer foil from Crown Roll Leaf, Inc (part #MG39-100G) to provide approximately 30% open area to form a discontinuous layer of transfer foil. The discontinuous layer of transfer foil was adhered to a textile backer using a continuous thermoplastic polyurethane adhesive (8) to form the second component, representing the thermally reflective layer. The layers were bonded together using a Geo Knight and Co. Model 178SU Heat Press at about 280° F. for about 8 seconds. Emissivity was measured on the discontinuous aluminum transfer foil side according to the test methods herein, and reported in Table 1.

The first component was then placed on top of the foil side of the second component and bonded together using a heat press as described in Example 1, and portions of the polyurethane adhesive corresponding to the open areas of the discontinuous layer of transfer foil adhered directly to the first component to form the construct. Multi-spectral test results for the construct samples prepared according to this example, and measured from the first component side, are shown in Table 1. The constructs had a visible reflection of approximately 7%, a nIR reflection of approximately 11%, a MWIR reflection of approximately 31%, and a LWIR reflection of approximately 43%. The hand for this sample was measured by the hand test method described herein to be 186 gm.

Example 3

A sample of a construct was prepared comprising a layer of colored ePTFE, Al foil and a textile backer as follows.

A first component was prepared by coloring a layer of 1.2 mil ePTFE (about 0.2 micron average pore size, and about 18 grams per square meter) with a single substantially continuous coating of black Sharpie® permanent marker to comprise the first substrate of the construct. Optical density and thermal transmission properties of the first substrate were measured according to the test methods herein, and reported in Table 1.

A second component was prepared by perforating a layer of Al transfer foil from Crown Roll Leaf, Inc (part #MG39-100 G) to provide approximately 30% open area to form a discontinuous layer of transfer foil to comprise the thermally reflective layer. The metal thickness of the Al transfer foil was calculated to be approximately 0.0008 inches. This discontinuous layer of transfer foil was adhered to a textile backer using a continuous thermoplastic polyurethane adhesive. The foil and textile backer layers were bonded together using a Geo Knight and Co. Model 178SU Heat Press at about 280° F. for about 8 seconds. Emissivity was measured on the discontinuous aluminum transfer foil side according to the test methods herein, and reported in Table 1.

The uncolored side of first component was placed on top of the foil side of the second component, and the first and second components were bonded together using a heat press as described in Example 1 to form a construct. Portions of the polyurethane adhesive corresponding to the open areas of the discontinuous layer of transfer foil adhered directly to the first component.

Multi-spectral test results for samples of constructs prepared according to this example, and measured from the first component side, are shown in Table 1. The constructs had a visible reflection of approximately 5%, a nIR reflection of approximately 11%, a MWIR reflection of approximately 48%, and a LWIR reflection of approximately 43%.

Example 4

A sample of a construct was prepared comprising printed ePTFE and metallized ePTFE in the following manner.

A first component of 1.2 mil ePTFE film (about 0.2 micron average pore size, and about 18 grams per square meter) was coated with an aqueous solution of about 13% Rhodapex ES-2 from Rhodia, Inc. and about 6% hexanol, and allowed to dry. A color image was printed on the coated ePTFE film using an HP Designjet 110 plus printer to create the first substrate. Optical density and thermal transmission properties of the first substrate of the first component were measured according to the test methods herein, and reported in Table 1.

A second component of metallized ePTFE was prepared in accordance with U.S. Pat. No. 5,955,175 using gold as the metal and omitting the oleophobic coating to create the thermally reflective layer. Emissivity was measured on the metallized side according to the test methods herein, and reported in Table 1.

The unprinted side of the first component was bonded to the metallized side of the second component using a 0.5 mil layer of polyethylene as described in Example 1.

Multi-spectral test results for samples of constructs prepared according to this example and measured from the first component side, are shown in Table 1 and shown in FIGS. 9, 10, and 11. The constructs had a visible reflection of approximately 38%, a nIR reflection of approximately 62%, a MWIR reflection of approximately 60%, and a LWIR reflection of approximately 47%, as reported in Table 1. The spectral response shown in FIG. 11 shows that constructs having printing on the ePTFE first component effects the reflectance in the visible wavelength region primarily between 250 nm to 600 nm.

Example 5

A sample of a construct was prepared substantially according to Example 1 with the following exceptions.

In place of a carbon-coated ePTFE layer, a first component was prepared by coloring a layer of 1.2 mil ePTFE (about 0.2 micron average pore size, and about 18 grams per square meter) with a single substantially continuous coating of black Sharpie® permanent marker to create the first substrate of the first component. Optical density and thermal transmission properties of the first substrate were measured according to the test methods herein, and reported in Table 1.

Emissivity was measured on the metallized side of a second component prepared and tested as in Example 1 according to the test methods herein, and reported in Table 1.

The uncolored side of the first component was then bonded to the metallized side of the second component using a discontinuous polyurethane adhesive. A textile was then laminated to the non-metallized side of the second component using a discontinuous polyurethane adhesive to form a construct. Multi-spectral test results for samples prepared according to this example were measured from the first component side, and are shown in Table 1 and shown in FIGS. 9, 10, and 11. The constructs had a visible reflection of approximately 5%, a nIR reflection of approximately 12%, a MWIR reflection of approximately 53%, and a LWIR reflection of approximately 54%, as reported in Table 1.

A sample prepared according to this Example was radar transparent having an average transmission of about 100% both throughout the range of 1-5 GHz and throughout the range of 1-20 GHz, when tested by the method provided herein. The sample was also tested for Hand measurements, weight in grams per square meter (gsm), and oleophobicity, according to the methods provided herein. The results are provided in Table 3.

Example 6

A sample of a construct comprising two layers of a carbon-coated ePTFE, joined by a metal coating was prepared in the following manner.

A sample of carbon-coated ePTFE prepared as described in Example 1, representing the first substrate of the first component. Optical density and thermal transmission properties of the first substrate were measured according to the test methods herein, and reported in Table 1.

The carbon-coated ePTFE first substrate of the first component was divided into two roughly equal sections. One section was painted with Krylon Interior/exterior gold metallic spray paint (Part No. 1510-H597) in accordance with the directions on the can to create the thermally reflective layer. The non-carbon coated side of the remaining non-painted section was placed over the wet paint of the other section and smoothed by hand to remove wrinkles, allowing the paint to act both as an adhesive and low emissivity component to form a composite sample. The sample was allowed to dry for about 10 minutes, and the emissivity was measured using a Devices and Services, Inc. (10290 Monroe Drive #202, Dallas, Tex. 75229) model AE emissometer.

Multi-spectral test results for samples of constructs prepared according to this example were measured from the first specimen side, and are shown in Table 1. The constructs had a visible reflection of approximately 9%, a nIR reflection of approximately 13%, a MWIR reflection of approximately 31%, and a LWIR reflection of approximately 41%.

A sample prepared according to this Example was radar transparent having an average radar transmission of about 100% both throughout the range of 1-5 GHz and throughout the range of 1-20 GHz, when tested by the methods provided herein. The sample was also tested for Hand measurements, weight in grams per square meter (gsm), and oleophobicity, according to the methods provided herein. The results are provided in Table 3.

Example 7

A sample of a construct comprising polypropylene and metal was prepared in the following manner.

A first substrate of the first component was prepared by coloring one side of a layer of 2.5 mil polypropylene film with a substantially continuous coating of black Sharpie® permanent marker. Optical density and thermal transmission properties of the first substrate were measured according to the test methods herein, and reported in Table 1.

A thermally reflective layer was prepared comprising a metallized ePTFE material substantially in accordance with U.S. Pat. No. 5,955,175. Emissivity was measured on the metallized side according to the test methods herein, and reported in Table 1.

The uncolored side of the first substrate was then bonded to the metallized side of the thermally reflective layer using a Geo Knight and Co. Model 178SU Heat Press at about 350° F. for about 10 seconds to form a construct.

Multi-spectral test results for samples of constructs prepared according to this example as measured from the colored side are shown in Table 1 and shown in FIGS. 9, 10, and 11. The constructs had a visible reflection of approximately 7%, a nIR reflection of approximately 16%, a MWIR reflection of approximately 43%, and a LWIR reflection of approximately 78%, as reported in Table 1.

Example 8

A sample of a construct of metallized polyurethane was prepared in the following manner.

A first substrate comprising a sample of 1 mil polyurethane film (Deerfield Urethanes, Part No. 1710S, Deerfield, Mass.), was metallized using physical vapor deposition. Approximately 300 nm of aluminum was deposited on the second surface of the first substrate by physical vapor deposition. This sample was then colored on the non-metallized side with a single substantially continuous coating of black Sharpie® permanent marker.

The first substrate sample properties were measured utilizing a non-metallized portion of the substantially Sharpie® marker coated PU film. Optical density and thermal transmission properties of this substrate were measured according to the test methods herein, and reported in Table 1 as a "'first component".

Multi-spectral test results for samples of constructs prepared according to this example were measured from the colored side, and are shown in Table 1. The constructs had a visible reflection of approximately 7%, a nIR reflection of approximately 13%, a MWIR reflection of approximately 54%, and a LWIR reflection of approximately 18%.

Example 9

A sample of a construct was prepared comprising a polyethylene film and aluminum foil in the following manner.

A first component was prepared by coloring a layer of 2.0 mil polyethylene film with a single substantially continuous coating of black Sharpie® permanent marker to comprise the first substrate of a first component. Optical density and thermal transmission properties of the first substrate were measured according to the test methods herein, and reported in Table 1.

A second component comprising Stor-It™ brand aluminum foil was used as the thermally reflective layer. The metal thickness of the aluminum foil used for this thermally reflective layer was calculated to be approximately 0.001 inches. Emissivity was measured according to the test methods herein, and reported in Table 1.

The uncolored side of the PE film was placed adjacent to the aluminum foil, and utilized as the multi-spectral, selectively reflective construct. Multi-spectral test results for samples of the construct prepared according to this example were measured from the colored side, and are shown in Table 1 and shown in FIGS. 9, 10, and 11. The constructs had a visible reflection of approximately 7%, a nIR reflection of approximately 23%, a MWIR reflection of approximately 70%, and a LWIR reflection of approximately 73%, as reported in Table 1.

A sample prepared according to this Example was not radar transparent, having an average transmission of about 0% throughout the range of 1-5 GHz and throughout the range of 1-20 GHz, when tested by the method provided herein. The sample was also tested for Hand measurements, weight in grams per square meter (gsm), and oleophobicity, according to the methods provided herein. The results are provided in Table 3.

Example 10

A sample of a construct was prepared substantially according to Example 5 with the following exception. In place of the discontinuous polyurethane adhesive, the first and second components were bonded together using a continuous coating of 3M Super 77™ adhesive multipurpose adhesive. The textile backer was also omitted.

Optical density and thermal transmission properties of the first substrate of the first component as prepared in Example 5, were measured according to the test methods herein, and reported in Table 1.

Emissivity of the second component was measured on the metallized side as in Example 5 according to the test methods herein, and reported in Table 1.

Multi-spectral test results for samples of constructs were measured from the colored side, and are shown in Table 1. This embodiment of the present invention had a visible reflection of approximately 4%, a nIR reflection of approximately 9%, a MWIR reflection of approximately 34%, and a LWIR reflection of approximately 16%.

Example 11

A sample of a construct was prepared substantially according to Example 8, substituting 1.5 mil polyethylene terephthalate (PET) film for the polyurethane film, Emissivity was measured from the non-metallized side, and the values are reported in Table 1 for the thermally reflective layer.

As in Example 8, the first substrate properties were measured utilizing a non-metallized portion of the substantially Sharpie® marker coated PET film. Optical density and thermal transmission properties of this substrate were measured according to the test methods herein, and reported in Table 1 as the "first component".

Multi-spectral test results for samples of constructs prepared according to this example were measured from the colored side, and are shown in Table 1. The constructs had a visible reflection of approximately 7%, a nIR reflection of approximately 17%, a MWIR reflection of approximately 63%, and a LWIR reflection of approximately 5%.

Example 12

A sample of a construct was prepared comprising ePTFE and a metallized ePTFE in the following manner.

A first component of 1.2 mil ePTFE film (about 0.2 micron average pore size, and about 18 grams per square meter) was measured for optical density and thermal transmission properties according to the test methods herein, and reported in Table 1.

A second component comprising metallized ePTFE was prepared in accordance with U.S. Pat. No. 5,955,175, representing the thermally reflective layer. Emissivity was measured on the metallized side according to the test methods herein, and reported in Table 1.

The first component was then placed against the metallized side of the second component, and a 0.5 mil layer of polyethylene film was placed in between. The layers were bonded together using a Geo Knight and Co. Model 178SU Heat Press at about 350° F. for about 10 seconds to form the construct. Multi-spectral test results for samples of the construct prepared according to this example, and measured from the carbon-coated ePTFE side of the sample, are shown in Table 1 and shown in FIGS. 9, 10, and 11.

The constructs had a visible reflection of approximately 86%, a nIR reflection of approximately 73%, a MWIR reflection of approximately 56%, and a LWIR reflection of approximately 83%, as reported in Table 1.

Example 13

A sample of a construct was prepared comprising carbon-coated ePTFE and metallized polyester in the following manner.

A sample was prepared by providing a first component of carbon-coated ePTFE as in Example 1 as the first substrate. A second component of Ni/Cu metallized polyester taffeta from Laird Co. (Product #3027-217) representing the thermally reflective layer (30) was then placed adjacent to the first substrate. The product specification sheet listed the metal thickness of this Ni/Cu metalized polyester taffeta as 152 µm. Multi-spectral test results for samples of the construct prepared according to this example were measured from the first component side, and are shown in Table 1, and shown in FIGS. 9, 10, and 11. The constructs had a visible reflection of approximately 10%, a nIR reflection of approximately 15%, a MWIR reflection of approximately 44%, and a LWIR reflection of approximately 61%, as reported in Table 1.

A sample prepared according to this Example was not radar transparent, having an average transmission of about 0% throughout the range of 1-5 GHz and throughout the range of 1-20 GHz, when tested by the method provided herein. The sample was also tested for Hand measurements, weight in grams per square meter (gsm), and oleophobicity, according to the methods provided herein. The results are provided in Table 3.

Example 14

Gore part # WJIX102108HZ was obtained to measure the multi-spectral reflective properties of the composite. The Gore part is representative of a military specification compliant fabric with acceptable visual and nIR performance, but no requirement of thermal reflectance properties. The fabric is a camouflage printed textile laminated to a bicomponent film with a backer textile. Each color of the 4 color pattern—Light tan, Urban tan, Light Coyote, and Highland—was measured as 14a, 14b, 14c, and 14d, respectively. The multi-spectral test results are given in Table 1. Reflectance on the scale of FIGS. 10 and 11 is in the range of 0.0 to 1.0, which correlates to a reflectance percentage between 0 and 100%, as reported in the examples and Table 1.

TABLE 1

Measurements of Sample Properties.

| Example | First Component | | | Thermally Reflective Layer Emissivity | Construct Total Reflection | | | |
|---|---|---|---|---|---|---|---|---|
| | Optical Density | Total Transmission (3-5 µm) | Total Transmission (9-12 µm) | | Vis | NIR | 3-5 µm | 9-12 µm |
| 1 | 1.95 | 62.7 | 73.4 | 0.12 | 7.8 | 11.7 | 28.4 | 50.0 |
| 2 | 1.95 | 62.7 | 73.4 | 0.38 | 6.8 | 10.5 | 30.9 | 42.5 |
| 3 | 4.15 | 74.3 | 71.3 | 0.38 | 4.8 | 11.1 | 48.3 | 42.8 |
| 4 | 2.53 | 81.1 | 67.2 | 0.08 | 38.1 | 61.5 | 59.8 | 47.0 |
| 5 | 4.15 | 74.3 | 71.3 | 0.12 | 5.4 | 12.1 | 53.0 | 53.7 |
| 6 | 1.95 | 62.7 | 73.4 | 0.34 | 9.4 | 13.4 | 30.8 | 41.1 |
| 7 | 1.08 | 67.0 | 85.7 | 0.12 | 7.4 | 16.4 | 42.5 | 77.7 |
| 8 | 1.19 | 55.0 | 22.1 | 0.04 | 6.9 | 12.6 | 54.2 | 17.9 |
| 9 | 1.07 | 70.2 | 77.6 | 0.02 | 6.9 | 23.4 | 70.2 | 72.9 |
| 10 | 4.15 | 74.3 | 71.3 | 0.12 | 4.2 | 8.9 | 34.2 | 16.3 |
| 11 | 1.09 | 60.8 | 18.7 | 0.02 | 7.0 | 17.1 | 62.5 | 5.1 |
| 12 | 0.75 | 90.8 | 86.1 | 0.12 | 86.1 | 72.6 | 56.4 | 82.9 |
| 13 | 1.95 | 62.7 | 73.4 | 0.15 | 9.8 | 14.8 | 43.8 | 61.3 |
| 14 a | — | — | — | — | 28.9 | 52.1 | 11.9 | 3.9 |
| 14 b | — | — | — | — | 23.6 | 47.9 | 9.7 | 7.1 |
| 14 c | — | — | — | — | 13.8 | 35.0 | 9.7 | 7.0 |
| 14 d | — | — | — | — | 8.9 | 35.9 | 9.9 | 6.8 |

TABLE 2

Moisture Vapor Transmission Rate Measured For Samples.

| Example | MVTR (g/m²/day) |
|---|---|
| 5 | >14000 |
| 6 | >8000 |
| 13 | >21000 |

TABLE 3

Radar Transparency Reported in Percent Transmission, Oleophobicity, Weight and Hand Measurements.

| Example No. | % Transmission At 1-5 GHz | % Transmission at 1-20 GHz | Oleo-phobicity | Weight (gsm) | Hand (gm) |
|---|---|---|---|---|---|
| 5 | 100 | 100 | 2 | 147 | 304 |
| 6 | 100 | 100 | 6 | 40 | 50 |
| 9 | 0 | 0 | 4 | 75 | 73 |
| 13 | 0 | 0 | 5 | 107 | 111 |

We claim:

1. A method for making a radar transparent, thermally and visually camouflaging construct, comprising the steps of:
    a. providing a first substrate comprising a thermally transparent first microporous polymeric material having a first surface and a second surface;
    b. providing a colorant;
    c. applying the colorant to at least the first surface of the first substrate to form a thermally transparent, visually opaque layer;
    d. providing a second substrate comprising a low emissivity component;

e. orienting the low emissivity component of the second substrate towards the second surface of the first substrate;

f. adhering the first and second substrates to form a construct having an average reflection of <70% in the wavelength range of 400 nm-600 nm, an average reflection of >25% in the wavelength range of and 9 μm-12 μm, and a radar transmission greater than 90% in the frequency range from 1 GHz to about 20 GHz.

2. The method of claim 1 wherein the thermally transparent polymeric material comprises ePTFE.

3. The method of claim 2 comprising printing a colorant on the ePTFE to form the thermally transparent, visually opaque layer.

4. The method of claim 1 wherein the second substrate comprises a second microporous polymeric layer and the method further comprises the step of vapor depositing a metal onto the second microporous layer.

5. The method of claim 4 comprising the step of affixing the first and second microporous layers together.

6. The method of claim 1 wherein the second substrate comprises a second microporous polymeric layer and the method further comprises the step of spraying a metal onto the second microporous layer.

7. The method of claim 6 comprising the step of adhering the first and second microporous layers together applying the metal spray as an adhesive.

8. The method of claim 1 comprising laminating at least one additional layer on a side of the construct proximate the second substrate.

9. The method of claim 8 wherein the at least one additional layer is a textile layer.

10. The method of claim 8 wherein the at least one additional layer is a radar camouflaging layer.

* * * * *

UNITED STATES PATENT AND TRADEMARK OFFICE
CERTIFICATE OF CORRECTION

PATENT NO.        : 8,779,964 B2
APPLICATION NO.   : 13/789962
DATED             : July 15, 2014
INVENTOR(S)       : William D. Kelsey et al.

It is certified that error appears in the above-identified patent and that said Letters Patent is hereby corrected as shown below:

In The Specification

Column 14, line 64: change "14µm" to --12µm--.

Signed and Sealed this
Twenty-third Day of June, 2015

Michelle K. Lee
*Director of the United States Patent and Trademark Office*